US012333476B2

(12) United States Patent
Cui et al.

(10) Patent No.: US 12,333,476 B2
(45) Date of Patent: Jun. 17, 2025

(54) PRECISION DELIVERY OF ITEMS TO MOVING TARGETS UTILIZING NETWORK-PROVIDED POSITION INFORMATION

(71) Applicant: AT&T Intellectual Property I, L.P., Atlanta, GA (US)

(72) Inventors: Zhi Cui, Sugar Hill, GA (US); Hongyan Lei, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 39 days.

(21) Appl. No.: 17/851,986

(22) Filed: Jun. 28, 2022

(65) Prior Publication Data

US 2023/0419235 A1    Dec. 28, 2023

(51) Int. Cl.
  *G06Q 10/083*    (2024.01)
(52) U.S. Cl.
  CPC .................. *G06Q 10/083* (2013.01)
(58) Field of Classification Search
  CPC ....... G06Q 10/083; G06Q 50/40; G06Q 50/60
  See application file for complete search history.

(56) References Cited

U.S. PATENT DOCUMENTS

| | | | |
|---|---|---|---|
| 2016/0323706 A1* | 11/2016 | Splaine | H04W 4/023 |
| 2016/0337782 A1* | 11/2016 | Suzuki | H04W 52/0206 |
| 2017/0311169 A1* | 10/2017 | Cai | H04W 72/53 |
| 2019/0035182 A1* | 1/2019 | Rephlo | G06Q 10/083 |
| 2019/0197780 A1 | 6/2019 | Rao | |
| 2019/0283240 A1* | 9/2019 | Skaaksrud | B60W 10/04 |
| 2020/0019925 A1 | 1/2020 | Tokhtabaev | |
| 2020/0051000 A1* | 2/2020 | Hodges | G06Q 10/083 |
| 2020/0130893 A1 | 4/2020 | Väin | |
| 2020/0172339 A1 | 6/2020 | Theobald | |
| 2021/0383322 A1 | 12/2021 | Williams et al. | |
| 2022/0114635 A1 | 4/2022 | Sumida | |
| 2022/0151421 A1 | 5/2022 | Sengstaken, Jr. | |

(Continued)

OTHER PUBLICATIONS

Zhang, Juan, Economic and Environmental Impacts of Drone Delivery, The University of Missouri—St. Louis, May 2021.*

(Continued)

*Primary Examiner* — Nathan Erb
(74) *Attorney, Agent, or Firm* — GUNTIN & GUST, PLC; Ralph Trementozzi

(57) ABSTRACT

Aspects of the subject disclosure may include, for example, obtaining first positional information comprising a location of a non-stationary entity mobile within an environment, the first positional information obtained from a service provider monitoring a positional status of the non-stationary entity within the environment. A path of the non-stationary entity is predicted according to the first positional information. A delivery device mobile within the environment is directed according to the predicted path to deliver an item to the non-stationary entity. Second positional information is obtained, identifying a location of the delivery device within the environment. A separation distance is calculated between the location of the non-stationary entity and the location of the delivery device within the environment and a delivery opportunity is detected based upon the separation distance not exceeding a threshold distance. Other embodiments are disclosed.

20 Claims, 11 Drawing Sheets

(56) References Cited

U.S. PATENT DOCUMENTS

2022/0153312 A1     5/2022  Pickett et al.
2023/0289817 A1*    9/2023  Ashby ................... H04L 9/3271
                                                        705/304

OTHER PUBLICATIONS

"New SID on NR Positioning Enhancements", 3GPP TSG RAN Meeting #86, Dec. 9, 2019, 3 pgs.
Dwivedi, et al., "5G positioning: What you need to know", https://www.ericsson.com/en/blog/2020/12/5g-positioning--what-you-need-to-know, Dec. 18, 2020, 10 pages.
Keating, et al., "The evolution of 5G New Radio positioning technologies", Nokia Bell Labs, White Paper, 2021, 8 pgs.

* cited by examiner

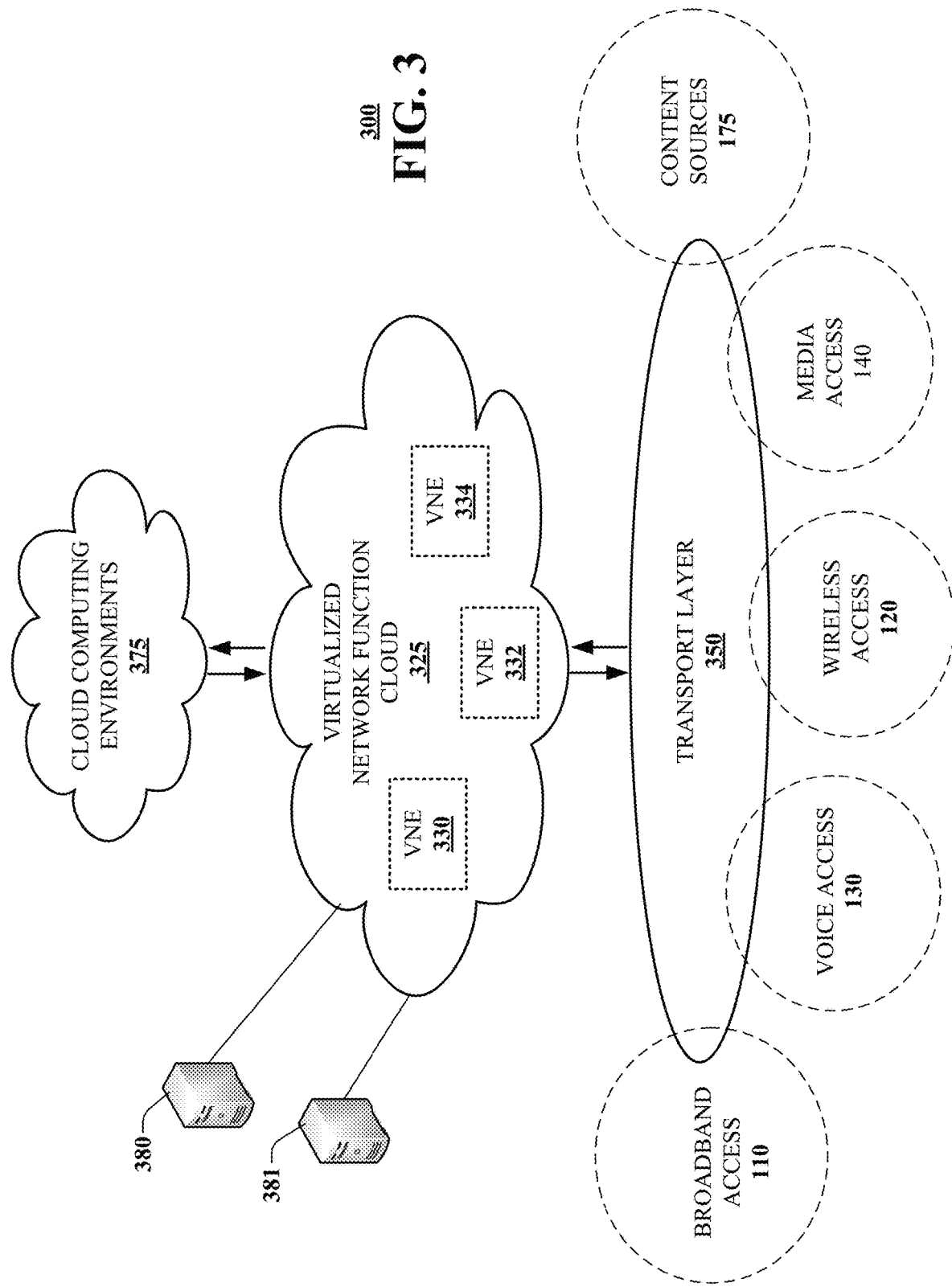

PRECISION DELIVERY OF ITEMS TO MOVING TARGETS UTILIZING NETWORK-PROVIDED POSITION INFORMATION

FIELD OF THE DISCLOSURE

The subject disclosure relates to precision delivery of items to moving targets utilizing network-provided position information.

BACKGROUND

Mobile communication networks may utilize wireless signals between a mobile communication device and one or more reference terminals at known locations to approximate a location of the mobile communication device. Such positioning technology may include timing-based, angle-based, power-based or hybrid techniques to locate mobile user equipment (UE) within a physical environment. For example, $3^{rd}$ Generation Partnership Project (3GPP) 3G, 4G systems, as well as Wi-Fi systems, incorporate positioning technology to determine approximate locations of mobile UE in communication with and/or otherwise managed by the system, without necessarily relying upon any position that may be reported by the UE, e.g., from an onboard location or GPS receiver. Examples of some services that utilize network derived positions include autonomously driven vehicles, material transport automation, e.g., operating within a warehouse environment, and estimation of an emergency caller's location.

Advancements in positioning technology are being introduced into 5G New Radio (NR) deployments that should enable mobile network operators to position devices for both indoor and outdoor applications with much better accuracy and reliability than those of previous generations.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
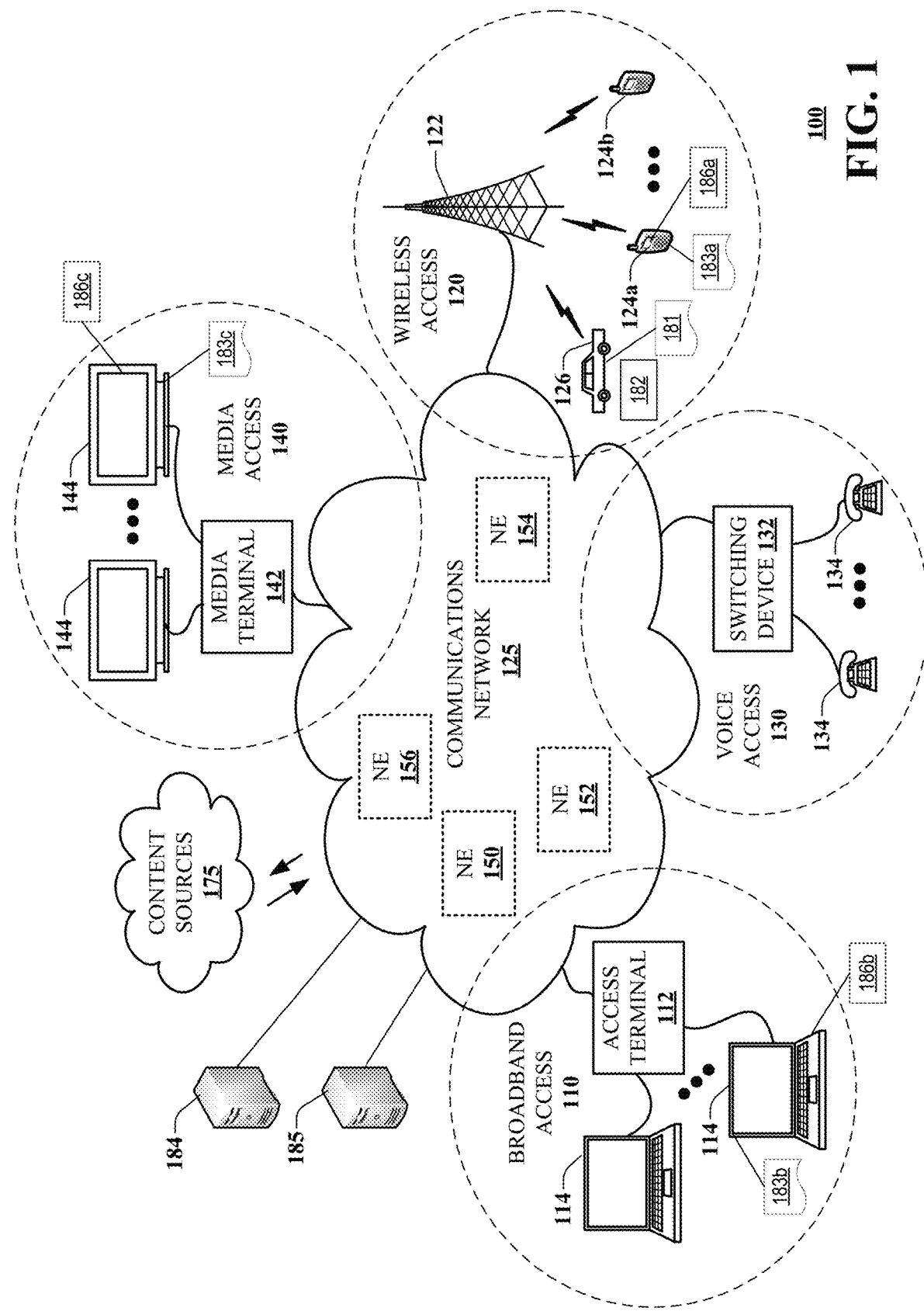
FIG. 1 is a block diagram illustrating an exemplary, no-limiting embodiment of a communications network in accordance with various aspects described herein.

The subject disclosure describes, among other things, illustrative embodiments for dynamic delivery of goods and/or services to a mobile recipient, the delivery utilizing high-accuracy positioning information obtained from a mobile network service provider and without necessarily requiring location information reported by equipment of the mobile recipient. Other embodiments are described in the subject disclosure.

One or more aspects of the subject disclosure include a process that includes receiving, by a processing system including a processor, a request for delivery of an item to a non-stationary entity configured with a unique identifier and mobile within an environment. According to the process, first positional information is obtained by the processing system and responsive to the receiving the request. The first positional information may be obtained from a service provider monitoring a positional status of the non-stationary entity within the environment, and includes a location of the non-stationary entity within the environment. According to the process, a path of the non-stationary entity may be estimated by the processing system according to the first positional information to obtain an estimated path. A delivery vehicle, mobile within the environment and adapted to deliver the item, may be directed by the processing system according to the estimated path. Second positional information identifying a location of the delivery vehicle within the environment may be obtained by the processing system and a separation distance between the location of the non-stationary entity and the location of the delivery vehicle within the environment may be calculated by the processing system. A delivery opportunity may be detected by the processing system based on the separation distance not exceeding a delivery threshold.

One or more aspects of the subject disclosure include a system having a processing system that includes a processor and a memory that stores executable instructions. The executable instructions, when executed by the processing system, facilitate performance of operations that include obtaining first positional information including a location of a non-stationary entity configured with a unique identifier and mobile within an environment. The first positional information is obtained from a service provider monitoring a positional status of the non-stationary entity within the environment. A path of the non-stationary entity may be estimated according to the first positional information to obtain an estimated path and a delivery vehicle mobile within the environment and adapted to deliver an item to the non-stationary entity may be directed according to the estimated path. Second positional information may be obtained that identifies a location of the delivery vehicle within the environment. A separation distance between the location of the non-stationary entity and the location of the delivery vehicle within the environment may be calculated and a delivery opportunity identified based on the separation distance not exceeding a delivery threshold.

One or more aspects of the subject disclosure include a non-transitory, machine-readable medium including executable instructions that, when executed by a processing system including a processor, facilitate performance of operations. The operations include obtaining first positional information from a service provider monitoring a positional status of the non-stationary entity within the environment. The first positional information may include a location of a non-stationary entity mobile within an environment. A path of the non-stationary entity may be predicted according to the first positional information to obtain a predicted path and a delivery device mobile within the environment and adapted to deliver an item to the non-stationary entity may be directed according to the predicted path. Second positional information may be obtained identifying a location of the delivery device within the environment. A separation distance between the location of the non-stationary entity and the location of the delivery device within the environment may be calculated and a delivery opportunity detected based on the separation distance not exceeding a threshold distance.

Referring now to FIG. 1, a block diagram is shown illustrating an example, non-limiting embodiment of a communication network 100 in accordance with various aspects described herein. For example, the communication network 100 can facilitate in whole or in part dynamic delivery of goods and/or services to a non-stationary, recipient entity mobile within an environment, without necessarily requiring location information from equipment of the recipient. Dynamic delivery may include obtaining first positional information of the recipient entity and predicting a movement pattern, e.g., a path of the entity based on the positional information. Second positional information may be obtained that identifies a location of a delivery device adapted to deliver goods and/or services to the recipient entity. The delivery device may maneuver within the environment in such a manner so as to intersect the recipient entity, without necessarily requiring a substantial alteration to the path of the entity. A delivery opportunity may be identified according to a separation distance between the delivery device and the recipient entity not exceeding a threshold distance. In particular, a communications network 125 is presented for providing broadband access 110 to a plurality of data terminals 114 via access terminal 112, wireless access 120 to a plurality of mobile devices 124a, 124b, generally 124, and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In at least some embodiments one or more of the mobile devices 124 may order a good and/or service 182 from supplier. Ordering and/or order fulfillment may be facilitated by an order fulfillment server 184. The order fulfillment server 184 may be in communication with one or more of the ordering devices, e.g., the mobile devices 124, the data terminal 114, and/or the display devices 144. For example, the ordering devices 114, 124, 144 may be configured with an ordering application program, or app 183a, 183b, 183c, generally 183. Without limitation, it is understood that one or more of the broadband access 110 and/or media access 140 may be provided on a mobile platform, such as an airplane, train, bus or ship. The order fulfillment server 184 may be in communication with a delivery coordination server 185 adapted to facilitate delivery of ordered items to moving delivery targets. The delivery coordination server 185 may coordinate operation of a delivery vehicle 126 to delivery an order item 182 to a delivery target, e.g., any of the ordering devices 114, 124, 144.

The delivery coordination server 185 and/or the delivery vehicle 126 may obtain positional information for the ordering devices 114, 124, 144, and orchestrate operation of the delivery vehicle to reach the ordering devices 114, 124, 144 in a safe, efficient and expedient manner to perform delivery of the ordered item 182. It is understood that one or more of the ordering devices may be provisioned with a unique ID 186a, 186b, 186c, generally 186, as may be used to identify and/or track positional information according to network resources. In at least some embodiments, the delivery vehicle 126 may include executable instructions 181 to facilitate autonomous operation of the delivery vehicle 126. It is understood that such autonomous operation may be based at least in part based on positional information of the delivery target obtained from a mobile network operator.

Figure 2A:
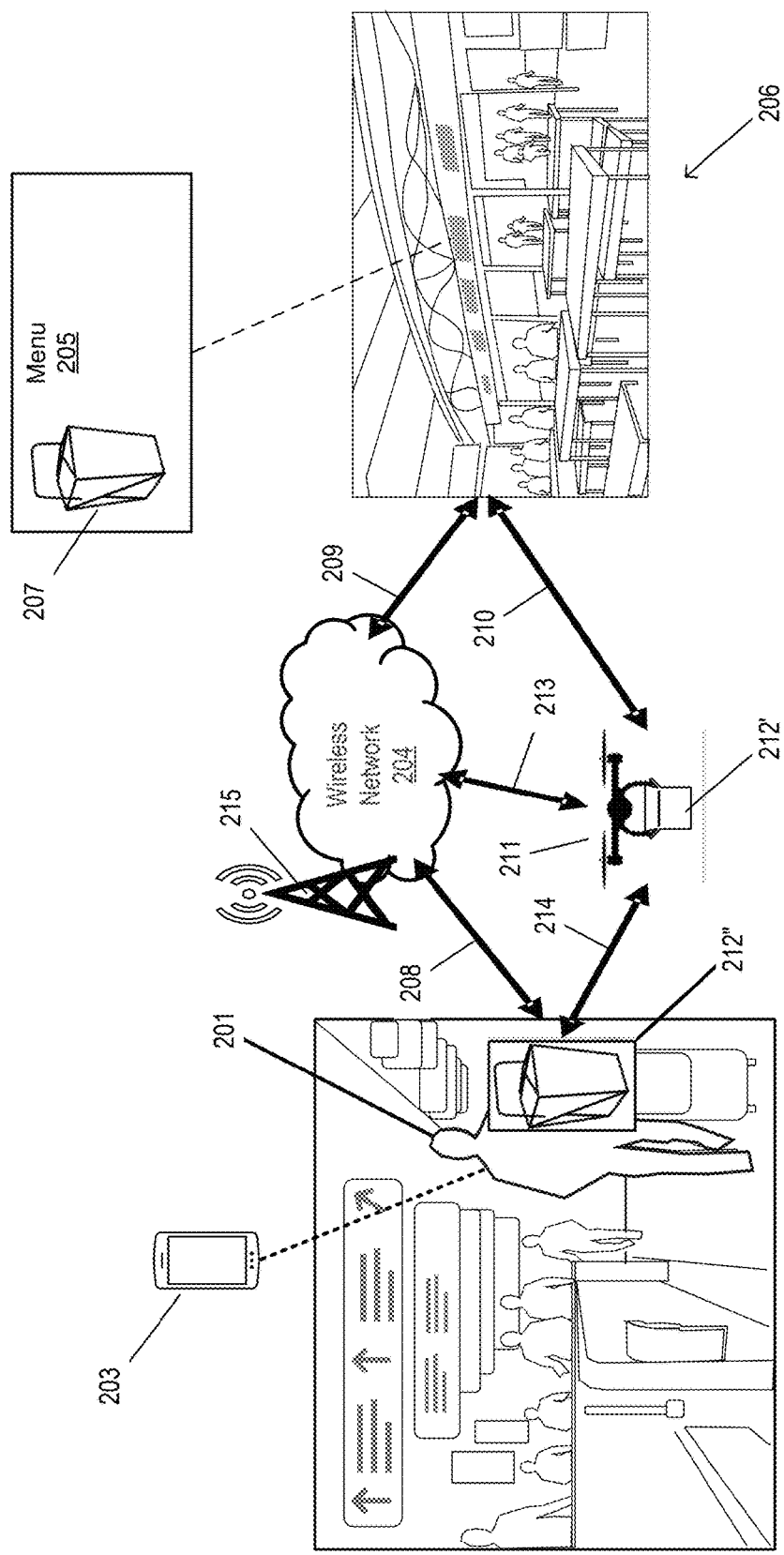
FIG. 2A is a block diagram illustrating an example, non-limiting embodiment of a moving target delivery system functioning within the communication network of FIG. 1 in accordance with various aspects described herein.

FIG. 2A is a block diagram illustrating an example, non-limiting embodiment of a moving target delivery system 200 functioning within the communication network 100 of FIG. 1 in accordance with various aspects described herein. According to the example, a mobile service subscriber, also referred to herein as a user 201, is moving within a physical environment 202. The user 201 is carrying mobile user equipment (UE) in the form of a mobile communication device, e.g., a smart phone 203. The example physical environment 202 represents an airport in which the user 201 is moving, e.g., walking and/or riding a moving walkway to a departure gate, possibly from an airport security checkpoint and/or from an arrival gate according to a gate transfer. The user 201 may be in a rush and uses their smart phone 203 to place an order for a snack, e.g., lunch from a restaurant 206 that may also be located at the airport, without having to detour and/or otherwise visit or stop at the restaurant 206, which may not be located along the user's planned path of travel. For example, the restaurant 206 may be located distant from the gate area, or perhaps in a food court area at another terminal and/or outside of the airport security perimeter.

Navigating larger facilities, such as major hub airports, may take considerable time given their size, security restrictions, crowds, and so on. According to the illustrative example, the user 201 may not have sufficient time to visit the food court area of the airport based on their flight schedule, or perhaps a preferred food vendor is located at a different terminal of the airport, or remote from the airport altogether. The user 201 may place an online order for a particular food item 207 using an online menu 205. The online menu 205 may be accessed using a convenient ordering kiosk and/or the user's smart phone 203. For example, the food order may be placed using a website portal and/or a mobile food ordering application program or app that may be resident at the ordering kiosk and/or on the smart phone 203. The restaurant 206 receives notification of the order, which may identify the ordered item as well as a user identity, e.g., a name, a username of a food ordering app, and/or some other identifier, such as an equipment ID, a mobile device ID, and the like. The restaurant 206 prepares the order of the particular food item 207 and may coordinate delivery of a prepared food item 212' to the user 201 using a remotely operated delivery vehicle 211. It is envisioned that the restaurant 206 may provide their own delivery service and/or employ a separately operated delivery service as may be provided to make similar deliveries from a number of different businesses. In this instance, and without limitation, the delivery vehicle 211 is a drone. Other suitable delivery vehicles may include, without limitation, one or more of robots, remotely operated delivery carriages, trains, conveyor belt systems, individual persons, and the like.

In more detail, the delivery vehicle 211 collects the prepared food item 212', and transports it to the user 201, while the user 201 is on the move. In this manner, a delivery of the prepared food item 212' may be accomplished without imposing on the user 201 any substantial departure from their travel path towards their intended destination, e.g., their departure gate, bag check, ground transportation. In at least some instances, the delivery may be made while the user 201 is in transit within the airport facility. In such scenarios, the actual delivery point, i.e., a location at which a transfer of the prepared item 212' from the delivery vehicle 211 to the mobile user 201, may be unknown beforehand. Namely, neither the user 201, the smart phone 203, the restaurant 206 or even the delivery vehicle 211, may be aware of the user's destination and/or a convenient delivery location at a time the order is placed, and perhaps even at a time at which the order is picked up by the delivery vehicle 211. In at least some embodiments, at least some information as to the user's intended destination and/or itinerary may be provided and used together with network provided location information to facilitate coordination of a delivery of the prepared item 212'.

According to the illustrative example, a location of the mobile user 201 may be inferred from a location of the user's smart phone 203, e.g., presuming the user is in possession of their smart phone 203. In at least some embodiments, a location of the smart phone 203 may be determined by a mobile network operator and/or some other third-party location service provider, using information obtained by and/or otherwise generated by the mobile network operator. In at least some embodiments, a delivery to an unspecified location may be made using network provided positional information. The positional information may be obtained from the location service provider upon request, e.g., a request from the ordering user, the ordered item provider, the delivery service provider, the delivery vehicle 211 and/or a remote operator of the delivery vehicle 211. Alternatively or in addition, the positional information may be obtained according to a schedule, e.g., every few seconds, or fractions of a second, e.g., every 1 sec, every 100 msec, and/or every 10 msec. It is worth noting here that the examples refer to deliver of ordered items to a user who may have placed the order. It is envisioned that any of the various techniques disclosed herein may be applied to other scenarios, e.g., in which one party sends an item to another, without necessarily requiring that the recipient was responsible for an ordering of the item.

The positional information may include one or more of a current location of the user, e.g., according to a network determined position of their smart phone 203, a prior location of their smart phone 203, a speed and/or direction of their smart phone 203, an acceleration, an inertial change of direction, and so on. Location information may include horizontal location information, e.g., according to some planar reference grid, such as a floor plan, a surface of the earth, e.g., geocoordinates, such as a latitude and/or longitude, location along a roadmap, a rail system, and so on. Alternatively or in addition, the positional information may include vertical location information, such as an elevation above some reference, such as a height above sea level, above or below ground level, a floor level of a multistory building, and so on.

The smart phone 203 may be in communication with a wireless network 204, that may be operated, at least partly, by the mobile network operator. For example, the smart phone 203 is in communication with one or more cell towers 215 and/or wireless access points via a first wireless link 208. Locational information of the smart phone 203 may be determined according to one or more network-based positioning techniques, such as the illustrative example techniques disclosed herein and/or otherwise generally known by those skilled in the art. For example, the mobile network operator may determine positional information based on wireless signals of the first wireless link 208 using one or more of timing, angle and/or power measurements obtained using processors at one or more mobile network base stations and/or one or more other facilities, such as a centralized location based processor. In particular, 3GPP 5G service requirements as specified in TS 22.261, include high-accuracy positioning requirements, characterized by ambitious system requirements for positioning accuracy.

The user's order for a requested food item may be forwarded to the restaurant 206 according to a second communication link 209. The second communication link 209 may be a wireless link and/or a landline link, e.g., via a terrestrial telephone system and/or a packet switched system, such as may be provided by an Internet service provider. The delivery vehicle 211 may be in communication with one or more of the restaurant 206 via a third communication link 210, the mobile network operator via fourth communication link 213 and/or the smart phone 203 via a fifth communication link 214. In at least some embodiments, the delivery vehicle 211 operates according to a remote control, e.g., driven by a delivery orchestration server as may be operated by a delivery service provider. Alternatively or in addition, the delivery vehicle 211 may operate autonomously, e.g., determining a delivery path according to positional information obtained from the mobile network operator. The delivery vehicle 211 preferably follows a delivery path that interests with the user's path to facilitate a delivery of the prepared food item 212" to the user 201 and with little or no impact to transit of the user 201 within the physical environment 202.

For example, a delivery location or point may be identified as an intersection of a delivery path of the delivery vehicle 211 and a path of the user 201. In at least some embodiments, the delivery may occur at and/or over an extended location, e.g., a user path segment, while the user 201 is moving. Depending upon the configuration of the delivery vehicle 211 and/or the prepared food item 212", delivery may include a transfer of the prepared food item 212" to the user 201 without requiring the user to pause, stop and/or otherwise depart from their path. Alternatively or in addition, delivery may require the user 201 to pause momentarily and/or possibly to step aside from a walkway, e.g., to retrieve the prepared food item 212" from the delivery vehicle 211 at a nearby, more convenient location, without requiring the user 201 to otherwise depart from their path.

Figure 2B:
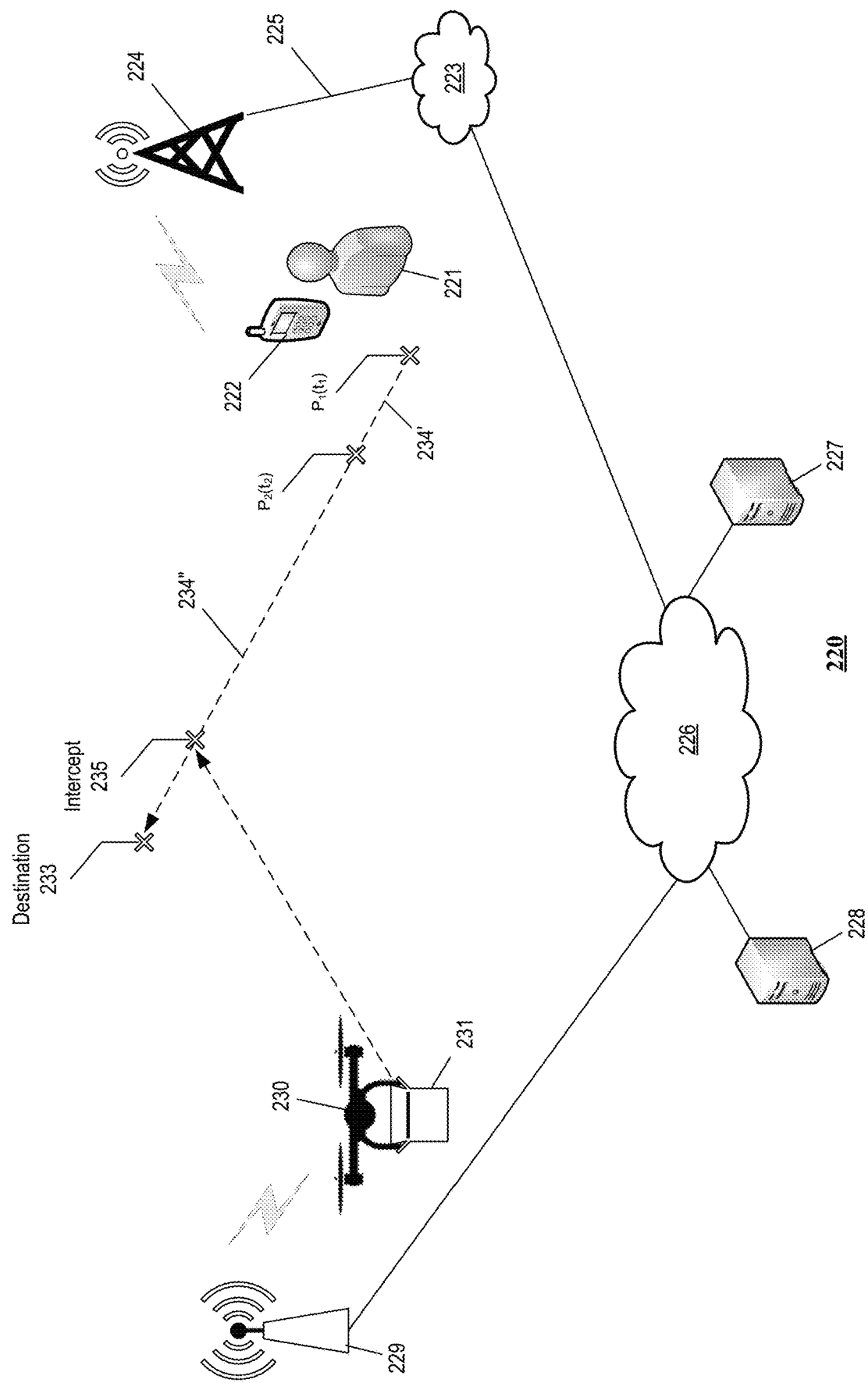
FIG. 2B is a block diagram illustrating another example, non-limiting embodiment of a moving target delivery system functioning within the communication network of FIG. 1 in accordance with various aspects described herein.

FIG. 2B is a block diagram illustrating another example, non-limiting embodiment of a moving target delivery system 220 functioning within the communication network 100 of FIG. 1 in accordance with various aspects described herein. The moving target delivery system 220 facilitates a dynamic delivery of goods and/or services to non-stationary entities that are mobile within an environment. In at least some embodiments the moving target delivery system 200 is adapted to coordinate a delivery to the moving target without obtaining positional information from the moving target and/or without necessarily requiring alterations to movement of a target entity within the environment.

According to the illustrative example, a mobile service subscriber, or user 221, is in possession of a mobile communication device, e.g., a mobile phone 222. The mobile communication device may include, without limitation, a mobile telephone, a smartphone, a smart watch, a tablet device, a laptop computer, augmented reality and/or virtual reality devices, such as goggles, and location tracking devices, such as the AirTag® tracking device available from Apple Inc. of Cupertino, CA. In at least some embodiments, the mobile communication device includes a location tracking device that may be used by the mobile network operator to identify and/or otherwise track a location of the device. By way of nonlimiting example, the location tracking device may include a radio transmitter and/or receiver adapted for the transmission of routing messaging according to operation of the mobile network, the routing messaging facilitating a locating, a monitoring and/or a tracking of positions of objects. In at least some embodiments, a location tracking device may include a computer peripheral used for locating, monitoring, and tracking the position of objects. Alternatively or in addition, a location tracking device may include a wearable item, e.g., in a form of a pin, a clip, a lanyard, a garment such as a hat, a shoe, a belt, a shirt. Other forms of location tracking devices may include, without limitation, carrying cases, luggage, headphones. It is understood that the location tracking devices may not be adapted to determine a location on their own, namely, without supporting location information provided by the mobile network operator. Accordingly, the location device does not necessarily include any sort of location receiver, such as a GPS receiver.

Continuing with the example, the mobile phone 222 is in wireless communication with a wireless access point 224, e.g., a mobile cellular access point, such as an eNodeB (eNB) and/or a gNodeB (gNB), via a macro cellular base station and/or a small cellular base station, such as a micro cell, a picocell and/or a femto cell. Alternatively or in addition, the wireless access point may include an IEEE 802.11 access terminal, such as a WiFi access point. Over the air communications between the mobile phone 222 and the access point 224 may occur over licensed frequency spectrum, unlicensed frequency spectrum or a combination of licensed and unlicensed frequency spectra. The wireless access point 224, in turn, may be in further communication with a core network portion of a mobile network 223. In at least some embodiments, the core network 223 determines and/or otherwise monitors positional information of the mobile phone 222.

According to the illustrative example, the user 221 is moving in a physical environment, such that the user 221 is a first position at a first time $t_1$, represented by a first point $P_1$. As the user 221 continues to move, the user arrives at a second position at a second time $t_2$, represented by a second point $P_2$. A time difference between times $t_1$ and to may correspond to a regular time interval, such as a position update time, or latency, which may be measured according to a few seconds, one second, and/or less than one second, e.g., on the order of 100's of msec, 10's of msec or even less. Alternatively or in addition, the time difference may correspond to an irregular time interval, e.g., determined according to measurement and/or position reporting updates. Having two or more positions of the user 221 corresponding to a known difference of time allows a speed and/or direction of the user to be determined, e.g., as a measure of the difference in position divided by the difference in time. To the extent $P_1$ and $P_2$ are measured in a horizontal plane, a speed may be determined according to the difference:

$$[(x_2-x_1)^2-(y_2-y_1)^2]^{1/2}/(t_2-t_1).$$

In at least some embodiments, a track may be determined based on present location and one or more past locations to provide an indication of a path history 234', a bearing or direction and perhaps speed. A track may be used to estimate a future position, e.g., according to a predicted future path 234" based on one or more of the path history 234' represented by the track, bearing and/or speed. Although the example refers to two dimensional examples, it is understood that the positions and/or paths may be determined in 3D, e.g., according to x-y-z position coordinates, latitude-longitude-elevation and the like, range, bearing, elevation, and so on.

In at least some embodiments, a position of the user 221 may be determined based on information obtained and/or otherwise calculated by the mobile network operator. For example, the mobile network 223 may provide a positioning service and/or a location service. Such positioning services provide positioning and location awareness of user equipment, such as the mobile phone 222, managed by the mobile network 223. By way of example, 3GPP LTE and new radio (NR) services support network-based positioning where measurements are reported by base stations and/or user equipment to a central location server 227 adapted to compute a position estimate based on the measurements. In particular, the 5G service requirements specified in TS 22.261 include high-accuracy positioning requirements, as may be beneficial for various applications, such as locating assets and moving objects such as forklifts, or parts to be assembled on a factory floor. Other examples include, without limitation, transportation, and logistics, such as the delivery of goods and/or services examples disclosed herein.

The 3GPP Rel-16 standards introduced time-based positioning methods for NR standalone deployments that techniques rely on one or more of time, angle and/or power measurements at either the device side, the network side or a combination of multiple measurements. By way of example, time-based positioning may include downlink time difference of arrival (DL-TDOA), uplink time difference of arrival (UL-TDOA), multi-cell round trip time (multi-RTT). Alternatively or in addition, angle-based positioning may include downlink angle of departure based positioning measurements (DL-AoD), uplink angle of arrival based positioning measurements (UL AoA), and/or combinations of angle with timing-based solutions to achieve higher accuracy.

In 3GPP Rel-17, NR positioning is further improved for specific use cases such as factory automation by enhancement to the 5G location services to include targeting location accuracy requirement of about 20-30 cm, as well as enhancements to latency reduction to enable positioning in time-critical use cases such as remote-control applications. By way of further detail, for general commercial use cases TS 22.261 refers to sub-meter level position accuracy requirement, i.e., <1 meter, including IIoT use cases (e.g., TS 22.804) that refer to position accuracy requirement of less than about 0.2 meters. Such enhancements to location accuracies or tolerance are combined with enhanced target latency requirements. Namely, the target latency requirement is <100 msec, while for at least some IIoT use cases, the target latency goal is on the order of 10 msec.

It is understood that positional information, e.g., including location accuracies may be determined separately for horizontal and vertical directions. For example, a positional accuracy in a horizontal plane may be provided according to a first accuracy, while a positional accuracy in a vertical direct, e.g., height above and/or below the horizontal plane, may be provide according to a second accuracy. It is understood further that for some networks, e.g., a 5G network, a continuous localization service may be offered indoors and outdoors across a wide area network, whereas, other networks, e.g., WiFi, are typically limited to indoors, while GNSS is typically limited to outdoors. In any realizable network, a positional accuracy may depend upon a density of radios, which may vary across a wide area coverage, e.g., offering a higher precision for some locations, e.g., indoor localizations, that may be equipped with a high density of radio access points, whereas a coarser precision may be offered for other locations, e.g., outdoor locations, that may be equipped with a lower density of base stations.

Continuing with the illustrative example, a delivery transport device, e.g., a drone 230, may be configured to deliver goods, e.g., an ordered item 231, and/or services to the mobile user 221. The system 220 may also include a delivery coordination server 228, in communication with the drone 230 via a wireless access point 229. The wireless access point 229 may include any of the various example wireless access terminals disclosed herein, including the same or similar wireless access point 224 in communication with the mobile phone 222. In operation, the drone 230 may receive positional information regarding the mobile user 221 via the network 226, including one or more of location updates of the user 221, variations in speed and/or direction. The drone 230 may operate autonomously, and/or in combination with information obtained from the delivery coordination server 228, to pursue and/or otherwise intersect a path of the user 221, e.g., plotting an intersection based on travel capabilities of the drone 230, any imposed restrictions that may be imposed by an operating environment, e.g., restricted travel areas, barriers such as walls and/or gates according to an estimated path of the user 221. For example, in some applications, the drone 230 may be capable of operating at greater speeds than a speed of the user 221, such that the drone 230 may be directed to an updated location of the user 221, by simply providing the updated position of the user. Such updates of user location may be provided to the drone periodically, until the drone 230 arrives within a sufficiently close proximity of the user 22 to facilitate delivery of the goods and/or services.

In at least some embodiments, the drone and/or delivery coordination server 228 may evaluate progress of a delivery to determine whether any adjustments may be appropriate. Progress may be evaluated periodically to determine whether the delivery vehicle is closer to the intended target user than a preceding progress evaluation. Updated estimated delivery locations and/or delivery times may be determined and/or otherwise updated according to the progress evaluations.

In some instances, the drone 230 may be directed to intersect along a historical portion of the user path 234', then essentially follow the user 221 according to positional updates provided by the central location server 227, until the drone 230 catches up to a position of the user 221 corresponding to an intercept location 235. Alternatively or in addition, the drone 230 may estimate a future path 234" of the user, determining an estimate of the intercept location 235 based on a path prediction, a speed of travel of the user 221 and a speed of travel of the drone 230. It is understood that such estimates of future paths 234" and/or intercept locations 235 may be adjusted and/or otherwise updated, e.g., according to a control loop based on an error value. The error value may be determined according to a predicted future location or path 234" and a later determined actual location or path corresponding to the prediction. The error may be used to adjust a variation to one or more of a speed, a direction and/or a path of the drone 230.

Figure 2C:
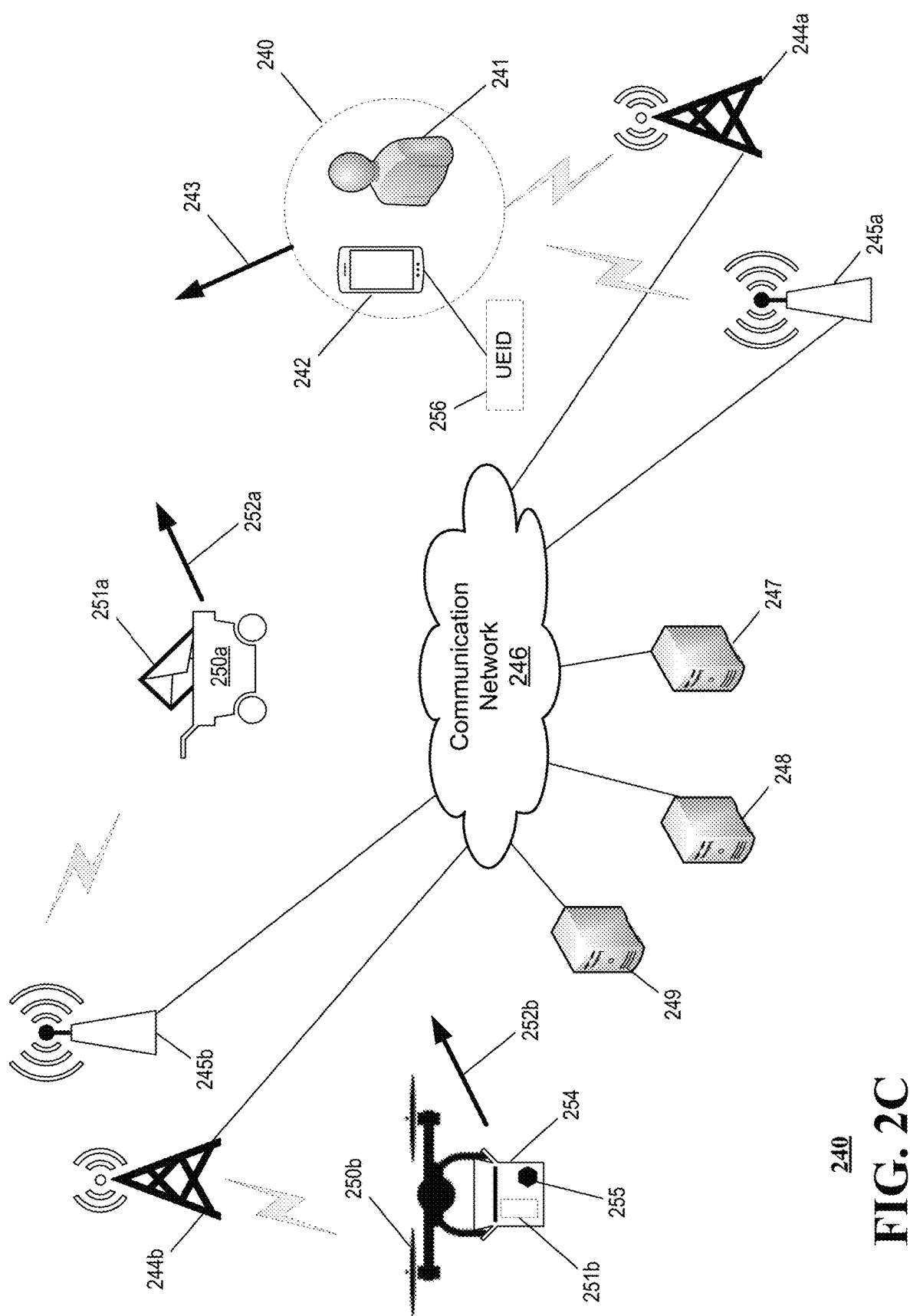
FIG. 2C is a block diagram illustrating an example, non-limiting embodiment of a moving target order and delivery system functioning within the communication network of FIG. 1 in accordance with various aspects described herein.

FIG. 2C is a block diagram illustrating an example, non-limiting embodiment of a moving target order and delivery system 240 functioning within the communication network 100 of FIG. 1 in accordance with various aspects described herein. The moving target order and delivery system 240 facilitates a remote ordering and dynamic delivery of goods and/or services to non-stationary entities that are mobile within an environment. In at least some embodiments the system 240 is adapted to coordinate a delivery to a moving target without obtaining positional information from the moving target and/or without necessarily requiring any substantial alterations to movement of the target entity. Accordingly, delivery may be made to the target moving along a path of travel without imposing any substantial departure from the path of travel due to the delivery.

The example moving target order and delivery system 240 provides an ordering and delivery service to a mobile service subscriber, or user 241, in possession of a mobile communication device, e.g., a mobile phone 242. The mobile phone 242 is in wireless communication with one of at least one first cellular base station 244a, at least one first wireless access point 245a, or a combination of both. The at least one first cellular base station 244a and/or the at least one first wireless access point 245a may be in further communication with a communication network 246 that may include one or more mobility core networks, e.g., providing one or more of 3G, 4G, 5G services to mobile subscriber equipment. In at least some embodiments, a core mobile network portion of the communication network 246 is adapted to calculate, derive, determine and/or otherwise monitor positional information of the mobile phone 242. Such positional information may be used in the course of providing mobile communication services to a mobile subscriber, e.g., establishing power levels, cell selection, handovers, and so on. Alternatively or in addition, such positional information gathered and/or otherwise determined by the mobile network operator may be offered as a service as may be utilized by third parties, such as providers of goods and/or services and/or delivery services adapted to deliver goods and/or services to the mobile subscribers.

In at least some embodiments, the moving target order and delivery system 240 includes a central location server 247. The central location server 247 may be collocated with the at least one first cellular base station 244a, and/or at the core mobile network portion of the communication network 246, and/or remotely accessible via the communication network 246, e.g., via the Internet, a metropolitan network and/or a portion of an enterprise network. The centralized location server 247 may be adapted to calculate, derive, determine and/or otherwise monitor position information of the mobile phone 242 using any of the example techniques disclosed herein or otherwise generally known for locating a wireless communication device. In at least some embodiments, the centralized location server 247 determines position information without necessarily relying upon a self-reported location as may be obtained using a location receiver, e.g., GPS receiver, of the mobile phone 242. Examples of positional information determined by the centralized location server 247 may include, without limitation, a current location of the mobile phone 242, an estimate of a speed and/or direction 243 of the mobile phone 242, an elevation of the mobile phone, a track based on current and/or prior location information obtained for the mobile phone 242, an estimated position based on prior positions, and/or any combination thereof.

In at least some embodiments, the centralized location server 247 updates a measurement, determination, and/or calculation of positional information according to a schedule, e.g., periodically according to an update schedule that may be a few seconds, about a second, or less than one second, e.g., a few milliseconds or tens of milliseconds. Alternatively or in addition, the centralized location server 247 updates a measurement, determination, and/or calculation of positional information on an irregular basis, e.g., during periods of opportunity as may be presented by reports generated by and/or otherwise received from mobile phone 242, the cellular base station 244a, the wireless access terminal 245a, the network operator and/or the centralized location server 247.

In at least some embodiments, the moving target order and delivery system 240 includes one or more of an ordering server 249 and a delivery coordination server 248. The ordering server 249 may be in communication with the mobile phone 242 and/or another third-party ordering platform, such as a communication device of someone other than the user 241, via the communication network 246 and otherwise adapted to receive a request or order for delivery of a good and/or service to the user 241. The order or request may indicate that the user 241 is mobile and that a delivery of the ordered goods and/or services should be accomplished in an expedient manner and preferably without requiring any diversion from the user's progress to their intended destination 233 (FIG. 2B). In at least some embodiments the order may provide an indication of a destination and/or way point of the mobile user 241. The destination and/or way point may be used in combination with updated locations of the user 241 to establish, update and/or otherwise determine a delivery path. It is understood that identification of the destination and/or way point may precede delivery of the ordered item, such that the order may be delivered while the user 241 is in transit to their indicated destination and/or way point. Alternatively or in addition, a request for identification of the user destination and/or way point may be initiated responsive to an ordering of delivery of a good or service to the mobile user 241. For example, the request may be sent to the intended recipient by way of a text message, an email, a voice message, a notification, and the like.

The delivery coordination server 248 may be in communication with the mobile phone 242, equipped with a unique ID 256, via the communication network 246 and otherwise adapted to receive a request or order for delivery of a good and/or service to the user 241. The order or request may indicate that the user 241 is mobile and that a delivery of the ordered goods and/or services should be accomplished in an expedient manner and preferably without requiring any diversion from the user's progress to their intended destination 233 (FIG. 2B). A determination of mobility may be made according to positional data of the mobile phone 242 determined and/or otherwise tracked by the mobile network operator according to the unique ID 256.

The delivery coordination server 248 may make one or more determinations to facilitate a successful delivery of an ordered good and/or service to the mobile user 241. For example, the delivery coordination server 248 may estimate a mode of travel of the mobile user 241. Such a determination may be based upon the environmental position information, e.g., a location that places the individual within a pedestrian space, such as an office facility, a university campus, a shopping mall, an airport, and so on. In such instances, the location information may suggest that the user is walking. To the extent the location information places the individual on a roadway, a railway, over a body of water, or at an altitude above ground, the delivery coordination server 248 may determine that the user is in a car, on a train or boat, or perhaps in an airplane. Alternatively or in addition, the delivery coordination server 248 may determine a movement indicator, such as a speed, an acceleration, and/or a direction of travel from the location information. The delivery coordination server 248 may use the movement indicator alone and/or in combination with any environmental position information, to determine a most likely mode of user travel of the mobile user 241.

Having established a mode of travel of the mobile user, the delivery coordination server 248 may select a type of delivery vehicle, e.g., a person, a robotic cart 250a adapted to carry an ordered item 251a, and/or a drone 250b also adapted to carry the ordered item 251b. Such selections may be based on one or more of a speed, terrain, physical barriers, security restrictions, and the like as may be determined from one or more of the movement indicator, environmental position information, and/or other information, such as terrain maps, building and/or campus maps, road and/or rail maps and the like. Alternatively or in addition, the delivery coordination server 248 may estimate, identify, determine and/or otherwise select a delivery path and/or trajectory 252a, 252b, generally 252, of the delivery vehicle 250a, 250b, generally 250. Such selections may be based on one or more of a speed, terrain, physical barriers, security restrictions, and the like as may be determined from one or more of the movement indicator, environmental position information, and/or other information, such as terrain maps, building and/or campus maps, road and/or rail maps and the like. In at least some instances the delivery path may be coordinated to a convenient location, such as a railway station stop for railway transit applications.

In at least some embodiments, the delivery coordination server 248 may identify a source of an ordered good based at least in part on a location, speed and/or trajectory of the mobile user 241, a movement indicator of the mobile user 241, environmental position information of the mobile user 241 and/or a mode of travel of the mobile user. It is envisioned that some ordered goods may be stored at multiple geographically dispersed locations. In such instance, the delivery coordination server 248 may select one of a group of geographically dispersed storage facilities as a source of an ordered good. Accordingly, a delivery path of the delivery vehicle 250 may include an initial path segment that intersects the selected storage facility to coordination a pickup of the ordered good and a subsequent path segment from the pickup location to a delivery location that interests the path of the mobile user 241.

It is envisioned that in at least some embodiments one or more of the ordering server 249, the delivery coordination server 248 and/or the central location server 247 may be in communication with the delivery vehicle 250 through one or more of a second cellular base station 244b and/or a second wireless access point 245b. Accordingly positional information for the delivery vehicle 250 may be determined by the mobile network operator and provided to one or more of the ordering server 249, the delivery coordination server 248 and/or the central location server 247 to facilitate execution of a delivery of a remotely ordered item to the mobile user 241.

In at least some embodiments, the mobile network operator determines positional information based on communication messages exchanged between the one or more of the second cellular base station 244b and/or the second wireless access point 245b. For example, the delivery vehicle 250 may be equipped with a mobile communication device adapted to communicate via a mobile network operated by the mobile network operator. Alternatively or in addition, one or more of the ordered item 251a, 251b, generally 251 may be equipped with a mobile communication device adapted to communicate via the mobile network. In at least some embodiments, the ordered item 251 is placed within a transport container 254 to facilitate transport of the ordered item 251 by the delivery vehicle 250. For example, the container may include a box, a tray, a frame, or any other suitable device adapted to secure and/or otherwise contain or hold the ordered item 251 during transport by the delivery vehicle 250. It is envisioned that in at least some embodiments, the transport container 254 may be adapted to communicate with the mobile network, e.g., by including a mobile communication device and/or an IoT device 255 adapted to communicate via the mobile network.

An IoT device may include a nonstandard computing device embedded with technology that connects wirelessly to the communication network 246, possibly via one or more of the cellular base stations 244a, 244b and/or one or more of the wireless access points 245a, 245b. The IoT device may be configured with an ability to transmit data to extend Internet capability to non-internet-enabled physical devices, such as everyday objects, e.g., cargo containers. In at least some embodiments, a cargo container may include one or more sensors that may be adapted to detect whether the container is empty or not, e.g., allow for a confirmation of a package pickup and/or drop off. Accordingly a deliverer may have trackable mobile device ID, which may be adapted to provide data related to package delivery progress, success, time of completion, delivery location, receipt confirmation, e.g., coordination with user/UE device, according to a handshake and/or secure transaction.

Figure 2D:
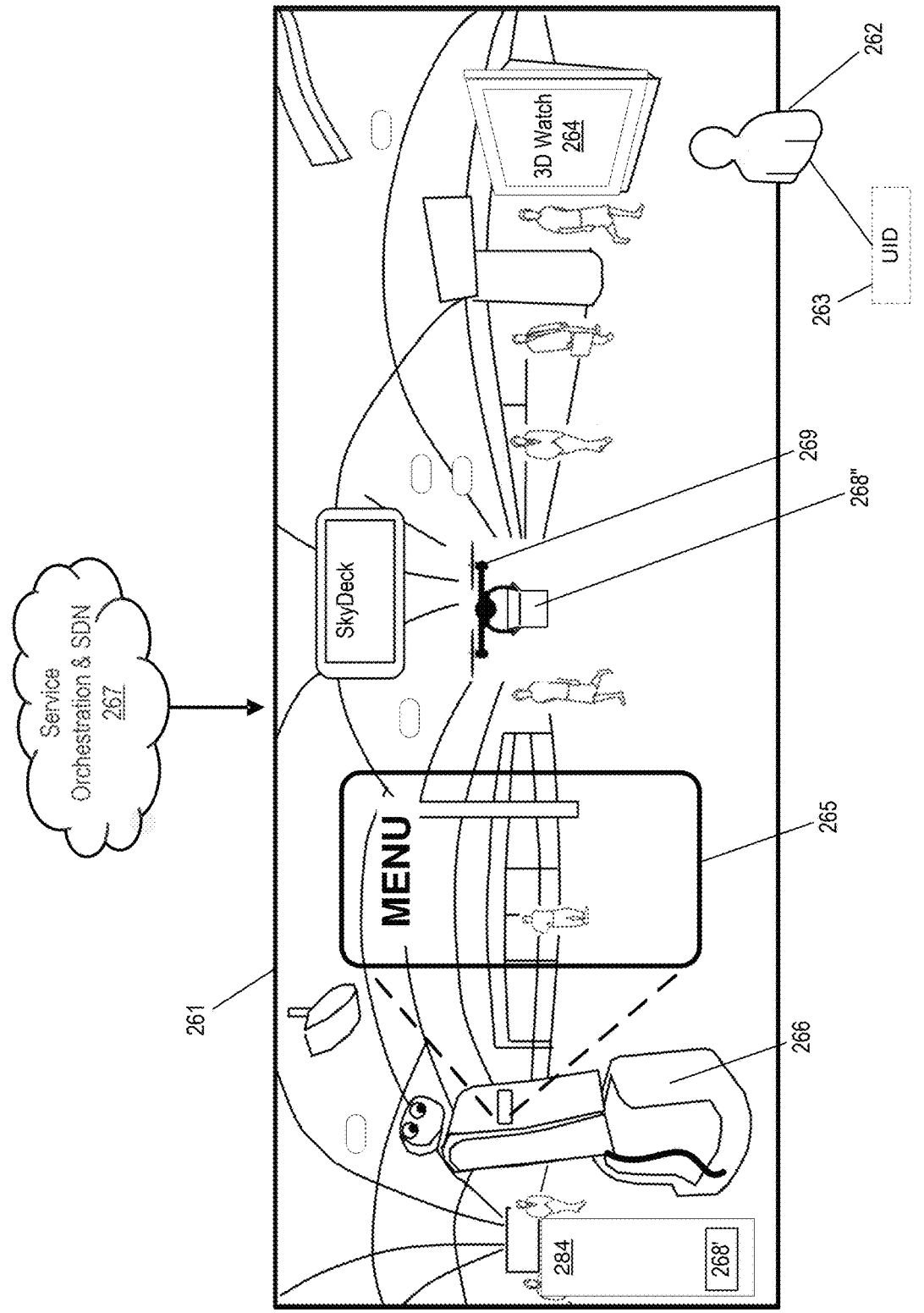
FIG. 2D is a block diagram illustrating an example, non-limiting embodiment of a metaverse delivery system functioning within the communication network of FIG. 1 in accordance with various aspects described herein.

FIG. 2D is a block diagram illustrating an example, non-limiting embodiment of a delivery system 260 functioning within the communication network of FIG. 1, and in accordance with various aspects described herein and otherwise adapted to deliver a good and/or service to an identified entity mobile within a virtual environment. According to the illustrative example, a delivery target may include a logical representation of an entity represented in a uniform and/or persistent manner within a virtual environment or space. Some examples of virtual environments include, without limitation, virtual 2D and/or 3D space as may be encountered using a gaming service, and/or a social media service, e.g., the metaverse. The delivery target may be a logical representation, e.g., an avatar of a real person and/or of a device, such as a vehicle, a car, a cart, a boat, a train, and/or an aerial vehicle such as a drone. Such delivery targets may be represented and/or otherwise tracked as they move within the virtual space.

More generally, the virtual space may be configured to maintain a persistent representation of animate objects, such as actors, individuals, animals, robots, vehicles and/or inanimate objects, such as devices, appliances, fixtures, architectural elements, environmental elements as may be perceived and/or otherwise observed or experienced by a participants within and/or observing the virtual space. Participants may include, without limitation, individuals, e.g., virtual space subscribers, persons, machines, e.g., AI, gaming controllers, vendors, manufacturers, service providers, financial service providers, legal entities in the virtual space and/or by other users who may be adapted to observe, participate and/or facilitate activity occurring with and/or otherwise related to activities occurring within the virtual space. Physical properties may be controlled according to a physics as may be imposed by the virtual environment. The physics may correspond to the real world, e.g., establishing certain limitations of movement due to size, inertia and so on. Alternatively or in addition, the physics may provide for movement and/or time shifts that are not dictated by reality. In either instance, coordination of any delivery of goods and/or services should adhere to the appropriate physical principles.

The example delivery system 260 operates within a virtual space 261 that may include a goods and/or service provider, e.g., a vendor 266, that offers a good and/or service for exchange and/or sale to a customer 262. The vendor 266 and/or the customer 262 may include logical instances of real entities, e.g., avatars for a real service provider and/or a real user, i.e., a customer, operating with the physical space. Likewise, in at least some instances, the good and/or service may include a logical instance of a real good or service. Whether the representations are logical representations of physical entities or not, the delivery system 260 may be adapted to coordinate and/or otherwise facilitate a delivery within the virtual environment 261 of the good or service to the customer 262 and/or some other coordinated delivery target, present within the virtual environment 261.

It is envisioned that a logical representation of the delivery target may have an associated identifier (ID), e.g., a unique ID within the virtual environment. The unique ID may include an ID assigned by a coordinating entity tasked with assigning unique IDs to persons, places and/or things within the virtual environment, e.g., an ID of a participating subscriber to a virtual service provider operating the virtual environment. Alternatively or in addition, the unique ID may include a logical instance of a physical device and/or tag 263. It is understood that metaverse objects may have globally unique IDs to permit appropriate tracking and representations within more than one virtual spaces that may be managed by a common and/or different entities. It is understood that such virtual-space, unique ID may be used to track and/or otherwise deliver the requested good and/or service item to the intended target, which itself may be mobile and/or moving within the virtual space. For example, a metaverse avatar may bake an item within the constraints of the virtual space, according to new recipe. The metaverse avatar may send a logical representation of the baked item to a metaverse friend.

According to the illustrative example, the customer 262 in the form of an avatar, has an associated globally unique ID 263 and orders an item from a virtual menu 265. The customer 262 may initiate the order using a virtual device represented within the virtual environment, such as a virtual phone, a virtual tablet, a virtual ordering kiosk, and/or a virtual smart watch 264. The virtual menu 265 may present a selectable listing of goods offered by the vendor 266 for lease and/or sale within the virtual environment 261. The customer 262 may select an item from the menu 265 using their virtual smart watch 264. A location of the customer 262 may be determined and/or otherwise tracked by an operator of the virtual space to present a uniform and persistent representation of the customer 262 within the virtual space 261. The virtual environment 261 may include an item store 284 that may be located at a particular location and/or distributed across various locations within the virtual environment 261. The item store 284 may include virtual representations of goods listed within the menu 265 for purchase and/or lease, such as the ordered good 268' selected by the customer 262.

In response to the order, the vendor 266 may coordinate delivery of the ordered item 268' from the item store 284 to the customer 262 within the virtual environment 261. As in a physical environment, delivery may be accomplished by a delivery vehicle that may include logical representations of any of the example delivery vehicles disclosed herein or otherwise used in making deliveries. The illustrative example uses a virtual representation of a drone 269. The drone 269 may transit within the virtual space 261 to a location of the item store 284 collect the ordered good 268' for delivery. The drone 269 is illustrated in transit, carrying the ordered good 268" along a delivery path within the virtual environment 261. The delivery path may be identified, planned, calculated, adjusted, and/or otherwise updated in a manner to reach a location of the customer 262 within the virtual environment 261.

In at least some embodiments, a virtual space operator may provide a location of the customer 262 within the virtual environment 261 to a delivery service provider. It is envisioned that the customer 262 may be stationary at some times and mobile at other times, such that a location of the customer 262 within the virtual environment 261 at a time of delivery may be unknown to the delivery service provider at any time from initiation of the delivery to completion of the delivery. It is understood that any of the delivery techniques disclosed herein as being applied in physical delivery scenario may be employed within a virtual delivery scenario occurring within the virtual environment 261.

In at least some embodiments a delivery of the ordered item 268" may be made to a location, e.g., a countertop and/or some other object adapted to receive a delivery, or a proxy of a person and/or virtual object to receive the delivered item. For example, a user may establish a proxy recipient object or entity, in a physical and/or virtual environment 261. The proxy recipient may have an identity, e.g., a globally unique ID, which may be used by a network and/or virtual space service provider to associate a location and/or motion associated with the proxy recipient in the physical and/or virtual environment 261. The proxy item may be selected by the customer 262, e.g., as a convenient location along the customer's path, such as a waypoint and/or an interim or terminal destination. Selection of the proxy item may be made at a time of ordering, and/or at a later time, including any time between placement of the order and delivery. Alternatively or in addition, a proxy item or class of proxy items may be identified by a user profile, as a preference for in-transit deliveries.

In some embodiments, utilization of a proxy item for delivery may be determined from the type of good and/or service ordered. For example, certain items may require particular care or procedures during receipt, such as in a delivery of a fragile or bulky item. In such instances, the recipient and/or the provider may suggest and/or otherwise require that a proxy item and/or location be utilized for delivery. The proxy item may be stationary and/or mobile and have a location that is determined and/or otherwise monitored by a network service provider and/or virtual space operator. In at least some embodiments, the proxy item may be equipped with an IoT communication device, e.g., a device RFID tag and/or transponder, such as a mobile communication transceiver.

It is understood that any of the objects and/or participants as may be involved with one or more of an order of a good and/or service, a delivery of an ordered good and/or service and/or receipt or transfer of an ordered good and/or service, may have an associated ID that may be used to associate information with the objects and/or participants according to physical properties and/or virtual properties. In at least some embodiments, the associated information may include metadata having any form and/or substance as may be beneficial in facilitating an ordering, a providing and/or a delivering of an ordered good and/or service. For example, the metadata may identify an owner of a store, or that a proxy item, e.g., a restaurant counter, belongs to a particular entity, such as a restaurant. Alternatively or in addition, the associated information may identify a property of an object, such as a physical attribute of a requesting entity, e.g., a height, a weight, an age, a gender, and/or perhaps some other physical limitation. Any of the associated information may be provided as metadata for consumption by any of the participants. In at least some embodiments, a mode of deliver, a timing of a delivery, a delivery path, a proxy entity, and the like, may be determined at least in part according to the metadata.

Figure 2E:
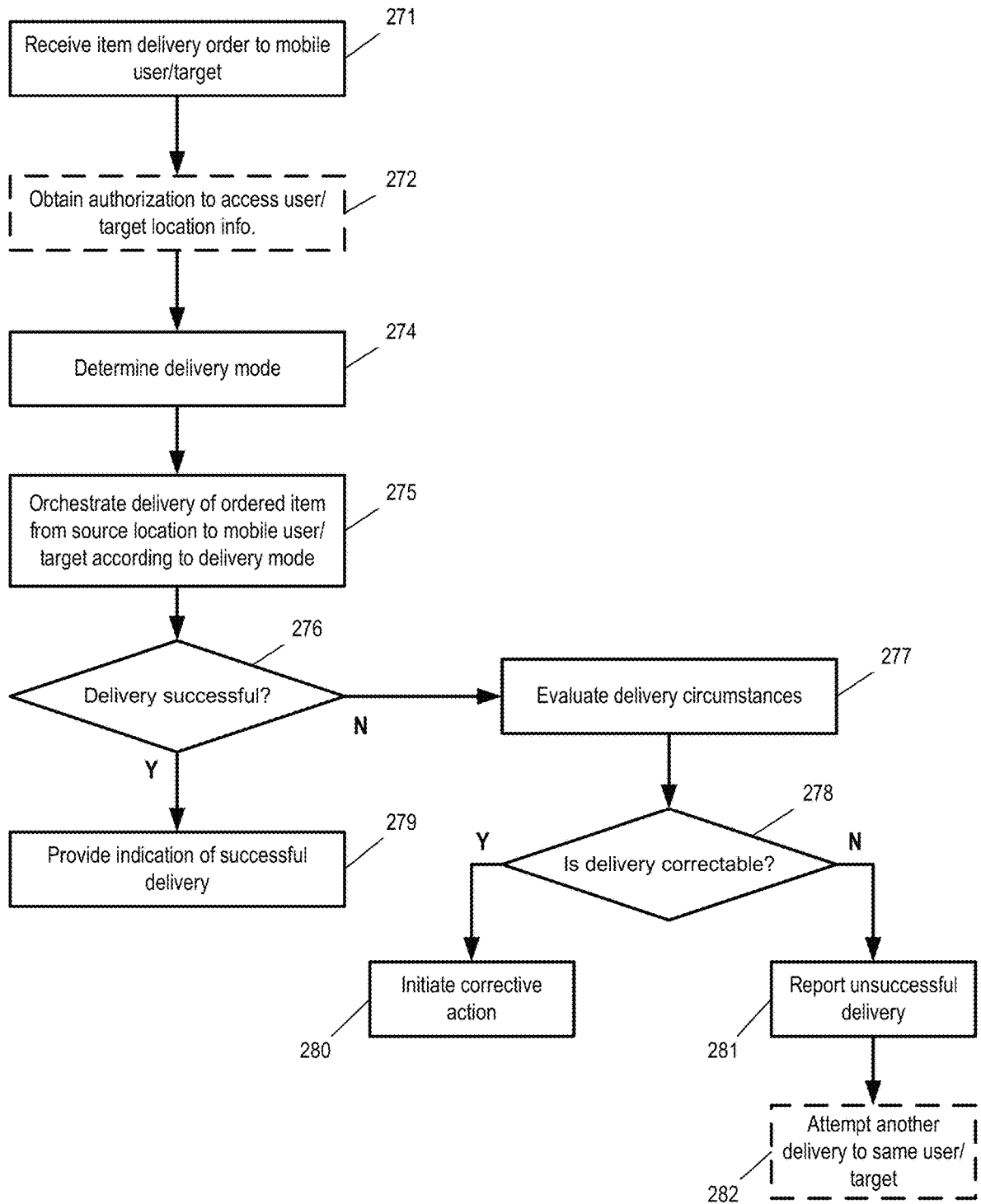
FIG. 2E depicts an illustrative embodiment of a moving target delivery process in accordance with various aspects described herein.

FIG. 2E depicts an illustrative embodiment of a moving target delivery process 270 in accordance with various aspects described herein. The delivery process 270 may facilitate a dynamic delivery of goods and/or services to a mobile recipient operating within a physical environment and/or a virtual environment. The delivery may utilize high-accuracy positioning information obtained from a mobile network service provider and/or a virtual environment service provider, without necessarily requiring location information reported by equipment of the mobile recipient.

According to the example moving target delivery process 270, a delivery order is received at 271. The delivery order identifies mobile delivery target, expected to move between an ordering and any delivery attempt. In at least some embodiments, the delivery order includes some environmental information that may be used to facilitate delivery. For example, the environmental information may identify an identity of the delivery target, a location of the delivery target, a destination of the delivery target, a characteristic of the delivery target and/or a preference of the delivery target. For example, the identity of the delivery target a may include a mobile network user identity and/or a mobile communication device identifier. Characteristic information may identify a user's size, age, physical constraint, e.g., a disability and/or an indication whether a user's hands are free. Preference information may identify whether the user is comfortable receiving the order while moving, and/or whether the user would prefer to pause and/or to move to a relatively quiet location to accomplish delivery of the ordered item.

In at least some embodiments, authorization to access user/target location information may be separate obtained at 272. For example, a mobile network operator and/or a virtual environment service provider may determine and/or otherwise track a location of a user according to a user and/or user equipment identifier. Such information may be protected by the service provider and only shared after having determined a suitable authorization. Authorization may include, without limitation, a user preference to share personal information, such as their positional information. The authorization may be made generally, to share with anyone and/or to share with one or more particular groups and/or individuals. For example, a pre-authorization to share positional information may be provided in a user preference for any vendor, any vendor within certain geographic limitations, and/or class of goods or services restrictions, and/or according to a pre-coordinated blacklist of prohibited vendors and/or a whitelist of authorized vendors. Alternatively or in addition, authorization may be determined at 272 by way of initiation of an authorization process in which a goods and/or service provider requests authorization and/or the ordering user grants authorization to share certain information including positional information. In at least some embodiments, the authorization may include a request for user input, e.g., by way of their mobile communication device, to confirm and/or otherwise grant authorization to share positional information. It is understood that such authorizations may be limited to a particular delivery, a particular venue, and/or a particular time constraint, such as a time window of hours, days, weeks, months, years, and so on.

According to the example process 270, a delivery mode may be determined at 274. The delivery mode may include identification of a delivery vehicle, e.g., a person, a robot, and/or a drone, as may be appropriate given positional constraints, travel speed, access restrictions to the delivery target, and so on. In at least some embodiments, the delivery mode may be determined at least in part according to a characteristic of the delivered item, e.g., a size, weight, fragility, thermal requirement, and the like. Alternatively or in addition, the delivery mode may be determined at least in part according to a characteristic and/or preference of the delivery target, e.g., an ordering user. For example, a user may request drone delivery whenever possible in order to receive the ordered item in a most expedient manner. Understanding that different delivery modes may have different delivery costs associated with them, it is envisioned that a user may request a most economical delivery mode. It is further envisioned that such preference may be used to select from among a group of possible delivery modes.

Having received the order, obtained any authorizations as may be necessary and identified a preferred and/or otherwise suitable delivery mode, delivery of the ordered item may be orchestrated at 275. The orchestrated delivery may be adapted to identify a source location of the ordered item, to obtain the ordered item from the source location, to identify a location, trajectory and/or path of the mobile target, and to facilitate transport of the ordered item from the source to the mobile target according to the determined delivery mode at 275.

A determination is made at 276 as to whether the delivery was successful. Success may be determined according to an acknowledgement receipt as may be provided by the delivery target, a confirmation that the transported item was removed from the transport vehicle, and/or an indication that a path of the transport vehicle approached a path of the delivery target to within some delivery zone. A delivery zone may include a distance around the delivery target location and/or a distance around the delivery vehicle and/or a distance between the delivery target and the delivery vehicle. For example, a delivery zone may be determined according to a personal space, e.g., an arm's reach, which may be equated to distance threshold, e.g., 1 meter or about 3 feet.

To the extent it was determined at 276 that the delivery was successful, an indication of successful delivery may be provided at 279. This indication may be provided to one or more of the delivery service provider, the goods and/or service provider, the mobile network operator, and/or the delivery target. Success criteria may include an indication from the delivery service provider that the delivery vehicle reached the delivery target and/or that a delivery vehicle sensor indicated removal of the transported item from the delivery device. Alternatively or in addition, the success criteria may include a confirmation from the delivery target that the delivery was successful. For example, a message may be sent to a mobile communication device of a user requesting confirmation that a deliver was made. It is conceivable that in at least some scenarios, delivery confirmation may be determined according to a surveillance system, such as surveillance video monitoring service. For example, surveillance video of an area in which a delivery was made may be requested and/or otherwise evaluated to determine an independent assessment of whether a delivery was successful. To the extent the delivered item is configured with a trackable location device, delivery confirmation may be established by coincidence of a location and/or movement of the delivered item and the delivery target. In at least some embodiments, an indication of a successful delivery may initiate a transactional process, such as a charge to a user account. Alternatively or in addition, an indication of successful delivery may initiate a return of the delivery vehicle to a storage location.

To the extent it was determined at 276 that the delivery was unsuccessful, one or more circumstances of the delivery may be evaluated at 277. Circumstances may include a review of sensor data, e.g., data from a sensor of the delivery vehicle, evaluation of positional information, and/or evaluation of information from another system and/or service provider, such as the example video surveillance service provider.

A determination may be made at 278 whether the delivery is correctable. In at least some instances, the determination may be based at least in part on any reviewed circumstances. For example, the delivered item may have been dropped from the delivery vehicle while in transit, and before any indication of an intersection of the delivery vehicle and delivery target paths. In at least some embodiments, the delivery vehicle may be adapted to retrieve and/or otherwise pick up a dropped item. Alternatively or in addition, the order may be re-initiated to reattempt delivery from a source. To the extent it is determined the delivery is correctable, initiate a corrective action at 280. However, to the extent it is determined that the delivery is not correctable, report unsuccessful delivery at 281.

To the extent a corrective action includes reattempting the delivery, the process may be repeated, e.g., from step 275 to orchestrate another delivery to the same user and/or delivery target at 282 and/or otherwise determine delivery success.

Figure 2F:
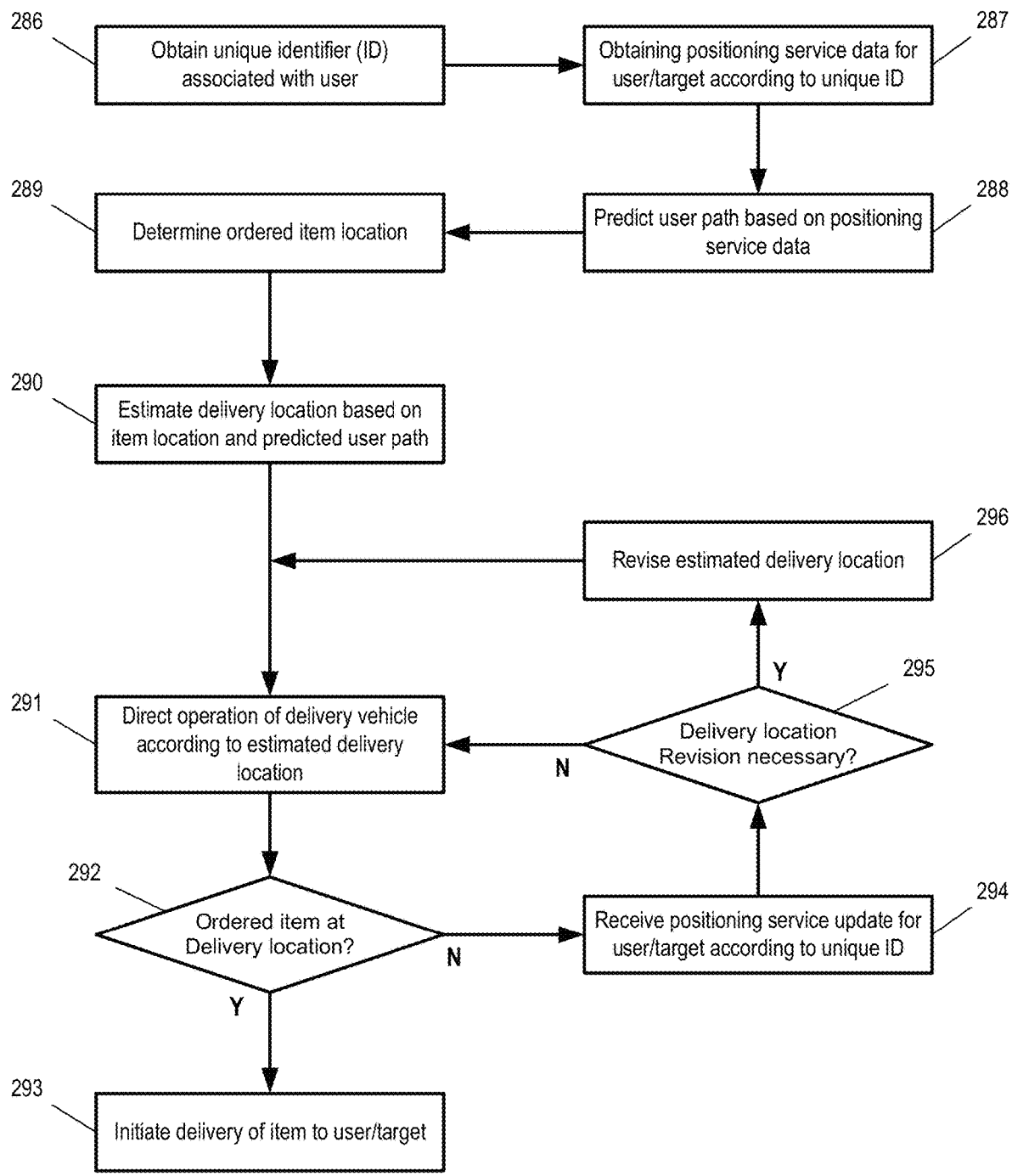
FIG. 2F depicts an illustrative example, non-limiting embodiment of a delivery orchestration process functioning in the moving target delivery process of FIG. 2E in accordance with various aspects described herein.

FIG. 2F depicts an illustrative example, non-limiting embodiment of a delivery orchestration process 285 functioning in the moving target delivery process of FIG. 2E in accordance with various aspects described herein. The orchestration process 285 may facilitate a dynamic delivery of goods and/or services to a mobile recipient operating within a physical environment and/or a virtual environment. The delivery may utilize high-accuracy positioning information obtained from a mobile network service provider and/or a virtual environment service provider, without necessarily requiring location information reported by equipment of the mobile recipient.

According to the example orchestration process 285, a unique identifier (ID) associated with user is obtained at 286. The unique ID may include a user identity, such as a subscriber identity utilized within a mobile communications network and/or within a virtual environment. Alternatively or in addition, the unique ID may include a device identifier, such as a mobile device ID as may be used to located, identify and/or otherwise track a mobile device within a mobile communication network, including across different mobile communication networks, e.g., as in a roaming scenario.

In some embodiments the unique ID is obtained from a service provider. For example, a supplier of goods and/or may receive an order for a good and/or service. The supplier may receive an identity of the user, e.g., their name, a username, a financial identity as may be associated with a bank account, a credit and/or a debit card. The supplier may have obtained the user identity in association with an order. A network service provider and/or virtual space service provider may associate the user ID with an equipment ID, which may be shared with the supplier, and/or otherwise maintained in confidence.

Positioning service data is obtained at 287 for the user and/or delivery target according to unique ID. The positioning service data may include, without limitation, any position, location and/or motion data, including, but not limited to the various examples disclosed herein, such as a 2D location, a 3D location, a direction of travel, a speed, an acceleration, including current and/or historical records of the same. The positioning data may be shared with the supplier and/or a delivery service provider according to the user ID, without necessarily having to disclose any particular equipment IDs as may be used by the service providers to identify and/or otherwise distinguish a mobile entity.

In at least some embodiments, a path of a delivery target, e.g., a mobile services subscriber, may be determined based at least in part on positioning service data at 288. For example, a historical record of a path may be prepared by keeping track of sequential updates of a present position of the delivery target. Alternatively or in addition, a future indication of the user's path may be estimated and/or otherwise predicted. Predictions may be based at least in part on current and/or prior positional information. Alternatively or in addition, predictions may be based on correlations of a map with a user's positional information, e.g., their location. Such correlations may indicate potential paths of travel, such as roadways, sidewalks, and/or hallways, while indicating unlikely paths that may obtain obstructions, such as walls.

In at least some embodiments, predictions may be based at least in part on an estimate of a user's destination and/or waypoints along their path of travel. Such destinations and/or waypoints may be expressly provided by the user, e.g., during an ordering process. Alternatively or in addition, the destinations and/or waypoints may be obtained from ancillary data. Such ancillary date may include a user's calendar entries, travel itineraries, travel affiliations, home and/or business address, and the like. If a user places an order for a food item at an airport, the user may provide their flight information, from which a departure time and/or gate location may be derived. Alternatively or in addition, an inference may be drawn that a user is traveling home after being away on a business trip from a calendar entry and/or a reasonable assumption based on a time of day, day of week, prior locations of the user, e.g., the prior day, and so on.

In at least some embodiments, machine learning and/or AI may be applied to identify a likely user path. An AI processor may be trained on data obtained from other travelers at the same or similar locations, such that the trained AI processor may provide predictions for a most likely path of travel. The path estimates may be compared to progress of the delivery target and error values may be determined, e.g., based on comparisons of delivery target path estimates to actual delivery target path progressions determined from positional information. In at least some embodiments, adjustments may be made, e.g., in a feedback loop manner, to a predicted delivery target path and/or estimated delivery location based on the comparisons and/or error values obtained from the comparisons.

According to the process 285, a location of the ordered item is determined at 289. The location may be determined responsive to placement of an order. For example, the supplier source location may be determined based on an identity of the supplier as determined from the order. Alternatively or in addition, one of a number of possible supplier source locations may be identified responsive to the order and based on a location of the delivery target and/or an identification or estimate of a destination and/or way point of the delivery target.

In at least some embodiments, an estimate of a delivery location may be obtained at 290 based on the source item location, the delivery target location and/or a predicted delivery target path. Operation of a delivery vehicle may be directed at 291 according to estimated delivery location. For example, the delivery vehicle may be directed to a waypoint and/or a destination, in anticipate of meeting the delivery target at the waypoint and/or destination. Alternatively or in addition, the process 285 may proceed without necessarily having determined a delivery location. In such instances, a location of the delivery target, and perhaps one or more of a direction and/or speed may be used to guide the delivery vehicle. Consider instances in which the delivery vehicle may be capable of traveling in speeds in excess of those attainable by the delivery target. In such instances, the delivery vehicle may pursue the delivery target, e.g., based on current and/or prior positional information. In such a manner, the delivery vehicle may catch up to the delivery target, e.g., according to minimizing delivery delay. Alternatively or in addition, the delivery vehicle may catch up to the delivery target, but wait for a more opportune time and/or location for initiating delivery. For example, if the delivery vehicle catches up to the delivery target while on an escalator, the delivery vehicle may coordinate a more opportune delivery location, perhaps after the delivery target exits the escalator.

A determination may be made at 292 as to whether the ordered item has arrived at a delivery location. Arrival at the delivery location may be determined according to a reported and/or otherwise determined location of the delivery vehicle. For anticipatory deliveries, the delivery vehicle may arrive at the delivery location in advance of the delivery target, e.g., at an are proximal to one end of an escalator, while the delivery target may be on the escalator. Alternatively or in addition, the delivery location may be determined according to a conjunction of positions of the delivery vehicle and the delivery target, e.g., to within some degree of precision, and/or delivery separation threshold. To the extent it was determined at 292 that the ordered item has arrived, the process 285 may proceed to initiate a delivery of the item to the delivery target at 293. However, to the extent it was determined at 292 that the ordered item has not yet arrived, updated positioning information for the delivery target may be obtained from a service provider at 294 according to a unique ID.

Having received updated positioning information, a determination is made at 295 as to whether any revision, adjustment and/or update to the delivery location may be necessary. To the extent it was determined at 295 that an updated delivery location is required, the estimated delivery location may be revised at 296 and the process 285 may continue to direct operation of the delivery vehicle at 291 according to the revised delivery location. However, to the extent it was determined at 295 that an updated delivery location is not required, the process 285 may continue to direct operation of the delivery vehicle at 291 according to the delivery location.

While for purposes of simplicity of explanation, the respective processes are shown and described as a series of blocks in FIGS. 2E and 2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of the communication network 100 the subsystems and functions of systems 200, 220, 240, 260 and processes 270 and 285 presented in FIGS. 1, 2A, 2B, 2C, 2D, 2E, 2F and 3. For example, virtualized communication network 300 can facilitate in whole or in part dynamic delivery of goods and/or services to a non-stationary entity mobile within an environment, without necessarily requiring location information from the recipient. Dynamic delivery may include obtaining first positional information of the entity and predicting a movement pattern, e.g., a path of the entity based on the positional information. Second positional information may be obtained that identifies a location of a delivery device adapted to deliver goods and/or services to the entity. The delivery device may maneuver within the environment in such a manner so as to intersect the non-stationary entity, without necessarily requiring an adjustment to the path of the entity. A delivery opportunity may be identified according to a separation distance between the delivery device and the non-stationary entity not exceeding a threshold distance.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

In at least some embodiments the system 300 includes an order fulfillment server 380 that may be in communication with one or more ordering devices according to one or more of the broadband access 110, the wireless access 120 and the media access 140. The order fulfillment server 380 may be in communication with a delivery coordination server 381 adapted to facilitate delivery of ordered items to moving delivery targets. One or more of the order fulfillment server 380 and the delivery coordinate server may be supported according to one or more of the virtualized network function cloud 325 and/or the cloud computing environments 375. The delivery coordination server 381 may coordinate operation of a delivery vehicle 126 to delivery an ordered item 182 to a delivery target, e.g., any of the ordering devices 114, 124, 144 (FIG. 1).

Figure 4:
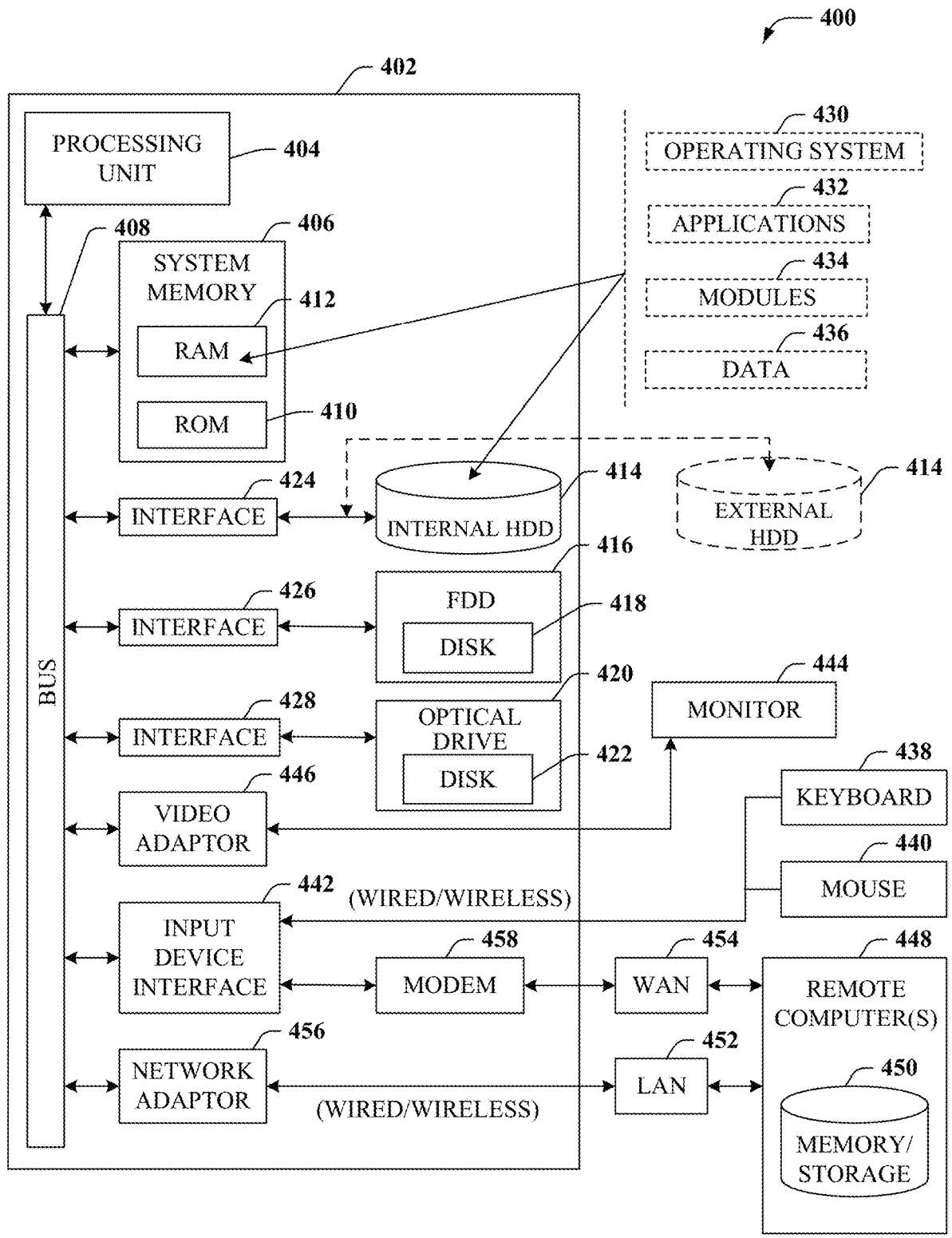
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part dynamic delivery of goods and/or services to a non-stationary entity mobile within an environment, without necessarily requiring location information from the recipient. Dynamic delivery may include obtaining first positional information of the entity and predicting a movement pattern, e.g., a path of the entity based on the positional information. Second positional information may be obtained that identifies a location of a delivery device adapted to deliver goods and/or services to the entity. The delivery device may maneuver within the environment in such a manner so as to intersect the non-stationary entity, without necessarily requiring an adjustment to the path of the entity. A delivery opportunity may be identified according to a separation distance between the delivery device and the non-stationary entity not exceeding a threshold distance.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
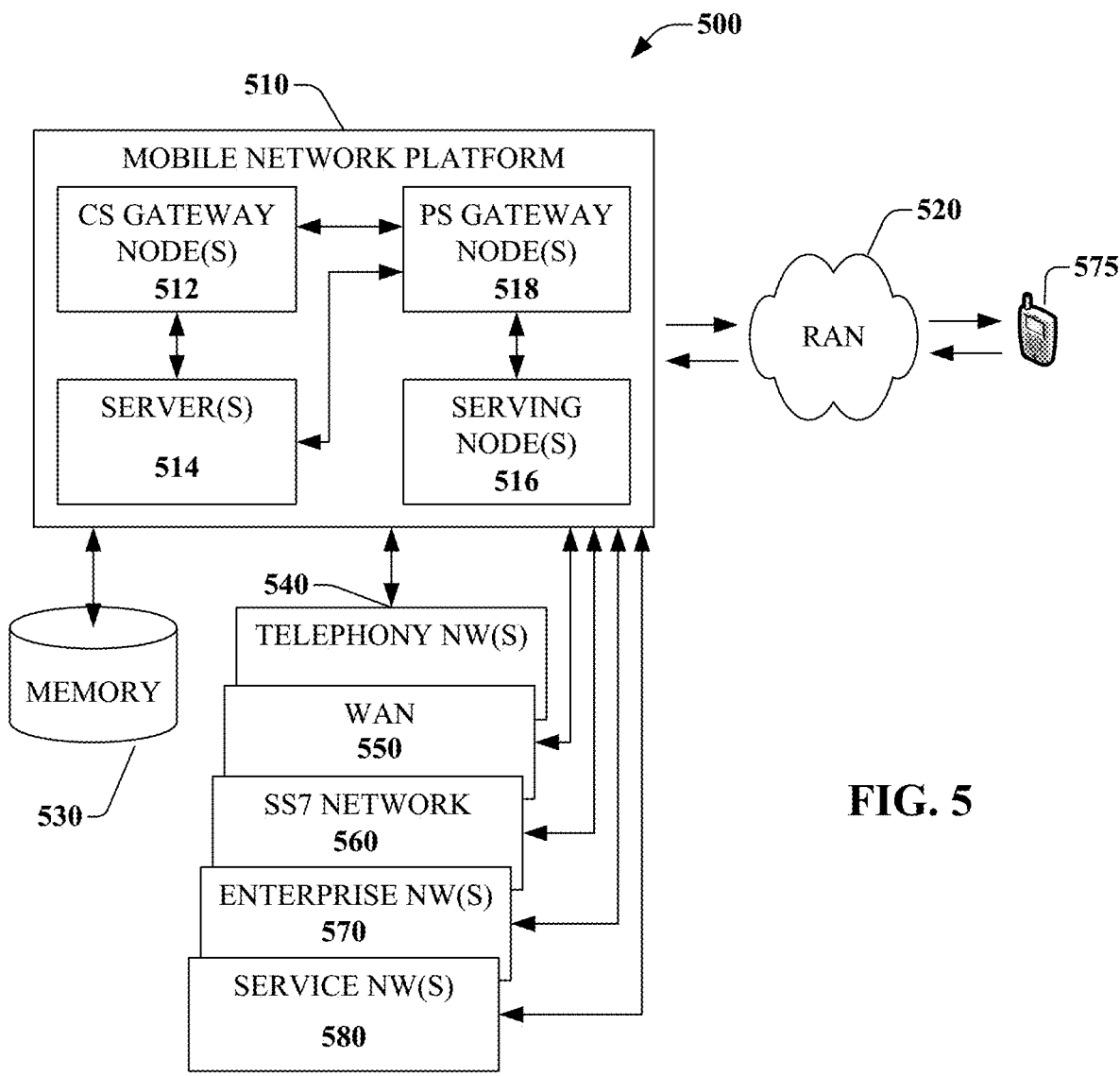
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part dynamic delivery of goods and/or services to a non-stationary entity mobile within an environment, without necessarily requiring location information from the recipient. Dynamic delivery may include obtaining first positional information of the entity and predicting a movement pattern, e.g., a path of the entity based on the positional information. Second positional information may be obtained that identifies a location of a delivery device adapted to deliver goods and/or services to the entity. The delivery device may maneuver within the environment in such a manner so as to intersect the non-stationary entity, without necessarily requiring an adjustment to the path of the entity. A delivery opportunity may be identified according to a separation distance between the delivery device and the non-stationary entity not exceeding a threshold distance. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS).

Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
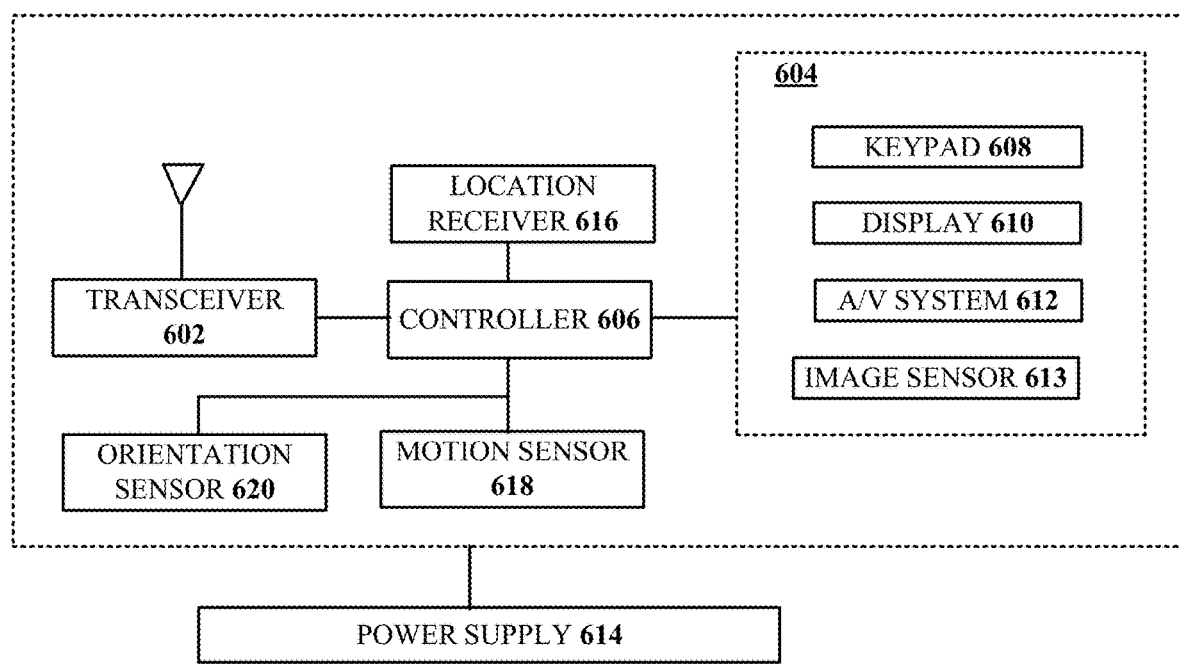
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part dynamic delivery of goods and/or services to a non-stationary entity mobile within an environment, without necessarily requiring location information from the recipient. Dynamic delivery may include obtaining first positional information of the entity and predicting a movement pattern, e.g., a path of the entity based on the positional information. Second positional information may be obtained that identifies a location of a delivery device adapted to deliver goods and/or services to the entity. The delivery device may maneuver within the environment in such a manner so as to intersect the non-stationary entity, without necessarily requiring an adjustment to the path of the entity. A delivery opportunity may be identified according to a separation distance between the delivery device and the non-stationary entity not exceeding a threshold distance.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:

receiving, by a processing system including a processor, a request for delivery of a physical item to a non-stationary entity having a unique identifier and mobile within an environment;

obtaining, by the processing system and responsive to the receiving the request, first positional information comprising a location of the non-stationary entity, the first positional information obtained from a service provider monitoring a positional status of the non-stationary entity within the environment;

estimating, by the processing system, a speed of the non-stationary entity, to determine an estimated speed;

estimating, by the processing system, a path of the non-stationary entity to obtain an estimated path, according to the first positional information and the estimated speed;

directing, by the processing system and according to the estimated path, movement of a delivery vehicle mobile within the environment and adapted to deliver the item;

obtaining, by the processing system, second positional information identifying a location of the delivery vehicle within the environment;

calculating, by the processing system, a separation distance between the location of the non-stationary entity and the location of the delivery vehicle within the environment;

detecting, by the processing system, a delivery opportunity based on the separation distance not exceeding a delivery threshold, wherein the delivery vehicle comprises a non-living delivery vehicle, and wherein the delivery opportunity comprises a transfer of the item to a mobile user traveling with the non-stationary entity, while the non-stationary entity is moving;

determining, by the processing system, a pattern of movement of the non-stationary entity based on the first positional information;

determining, by the processing system, an indication that the non-stationary entity is able to receive the item while moving; and determining, by the processing system, a delivery strategy according to the pattern of movement and the indication that the non-stationary entity is able to receive the item while moving.

2. The method of claim 1, wherein the non-stationary entity comprises a mobile communication device operating within a physical environment, wherein the unique identifier comprises an international mobile subscriber identity number, and wherein the service provider comprises a mobile network operator.

3. The method of claim 2, wherein the delivery vehicle comprises an unmanned vehicle.

4. The method of claim 3, wherein the unmanned vehicle comprises a drone.

5. The method of claim 1, wherein the method additionally operates in an additional mode wherein: the non-stationary entity comprises a logical mobile entity operating within a three-dimensional (3D) virtual space, wherein the unique identifier comprises a self-sovereign identity and wherein the service provider comprises a virtual-space service provider.

6. The method of claim 5, wherein, in the additional mode, the delivery vehicle comprises a logical representation of a physical delivery vehicle operating within the 3D virtual space, wherein the physical item is instead a logical representation of an item, wherein the mobile user comprises a mobile avatar and wherein the transfer of the item to the mobile user while the non-stationary entity is moving further comprises a transfer of the logical representation of the item to the mobile avatar while the non-stationary entity is moving within the 3D virtual space.

7. The method of claim 1, wherein the first positional information comprises geocoordinates obtained from a service provider and having an accuracy approximating the delivery threshold.

8. The method of claim 7, wherein the geocoordinates are provided with an accuracy approximating an arm's reach of the non-stationary entity, and wherein the transfer of the item to the mobile user is over an extended segment of the path of the non-stationary entity.

9. The method of claim 1, wherein the delivery strategy further comprises:

determining, by the processing system, a physical attribute of the mobile user, wherein the determining the indication that non-stationary entity is able to receive the item while moving is according to the physical attribute; and identifying, by the processing system, a delivery mode that facilitates delivery without requiring the non-stationary entity to one of pause, stop, or deviate from the path of the non-stationary entity.

10. The method of claim 9, wherein the determining the delivery strategy further comprises:

determining, by the processing system, a delivery path adapted to intersect with the estimated path, and wherein the determining the physical attribute of the mobile user further comprises identifying hands of the mobile user are free to accept the item.

11. A system, comprising:

a processing system including a processor; and a memory that stores executable instructions thereon that, when executed by the processing system, cause the processing system to perform operations, the operations comprising:

obtaining first positional information comprising a location of a non-stationary entity having a unique identifier and mobile within an environment, the first positional information obtained from a service provider monitoring a positional status of the non-stationary entity within the environment;

estimating a speed of the non-stationary entity, to determine an estimated speed;

estimating a path of the non-stationary entity to obtain an estimated path, according to the first positional information and the estimated speed;

directing, according to the estimated path, movement of a delivery vehicle mobile within the environment and adapted to deliver a physical item to the non-stationary entity;

obtaining second positional information identifying a location of the delivery vehicle within the environment;

calculating a separation distance between the location of the non-stationary entity and the location of the delivery vehicle within the environment;

identifying a delivery opportunity based on the separation distance not exceeding a delivery threshold, wherein the delivery vehicle comprises a non-living delivery vehicle, and wherein the delivery opportunity comprises delivery while the non-stationary entity is moving;

determining a pattern of movement of the non-stationary entity based on the first positional information;

determining an indication that the non-stationary entity is able to receive the item while moving; and determining a delivery strategy according to the pattern of movement and the indication that the non-stationary entity is able to receive the item while moving.

12. The system of claim 11, wherein the non-stationary entity comprises a mobile communication device operating within a physical environment, wherein the unique identifier comprises an international mobile subscriber identity number, and wherein the service provider comprises a mobile network operator.

13. The system of claim 11, wherein the system additionally operates in an additional mode wherein: the non-stationary entity comprises a logical mobile entity operating within a three-dimensional (3D) virtual space, wherein the unique identifier comprises a self-sovereign identity and wherein the service provider comprises a virtual-space service provider.

14. The system of claim 11, wherein the delivery vehicle comprises a mobile communication device in communication with a mobile network.

15. The system of claim 14, wherein the directing the delivery vehicle comprises communicating with the delivery vehicle via the mobile network.

16. The system of claim 14, wherein the mobile network is adapted to support wireless communications to the mobile communication device via a licensed spectrum.

17. A non-transitory, machine-readable medium, storing executable instructions thereon that, when executed by a processing system including a processor, cause the processing system to perform operations, the operations comprising:
- obtaining first positional information comprising a location of a non-stationary entity mobile within an environment, the first positional information obtained from a service provider monitoring a positional status of the non-stationary entity within the environment;
- estimating a speed of the non-stationary entity, to determine an estimated speed;
- predicting a path of the non-stationary entity to obtain a predicted path, according to the first positional information and the estimated speed;
- directing, according to the predicted path, movement of a delivery device mobile within the environment and adapted to deliver a physical item to the non-stationary entity;
- obtaining second positional information identifying a location of the delivery device within the environment;
- calculating a separation distance between the location of the non-stationary entity and the location of the delivery device within the environment;
- detecting a delivery opportunity based on the separation distance not exceeding a threshold distance, wherein the delivery device comprises a non-living delivery device, and wherein the delivery opportunity comprises delivery while the non-stationary entity is moving;
- determining a pattern of movement of the non-stationary entity based on the first positional information;
- determining an indication that the non-stationary entity is able to receive the item while moving; and
- determining a delivery strategy according to the pattern of movement and the indication that the non-stationary entity is able to receive the item while moving.

18. The non-transitory, machine-readable medium of claim 17, wherein the non-stationary entity comprises a mobile communication device operating within a physical environment and wherein the service provider comprises a mobile network operator.

19. The non-transitory, machine-readable medium of claim 17, wherein the processing system additionally operates in an additional mode wherein: the non-stationary entity comprises a logical mobile entity operating within a three-dimensional virtual space and wherein the service provider comprises a virtual-space service provider.

20. The non-transitory, machine-readable medium of claim 17, wherein the processing system additionally operates in an additional mode wherein: the non-stationary entity comprises a logical mobile entity operating within a three-dimensional (3D) virtual space, and wherein the delivery device comprises a logical representation of a physical delivery device operating within the 3D virtual space, wherein the physical item is instead a logical representation of an item, wherein the non-stationary entity comprises a mobile avatar and wherein the delivery comprises a transfer of the logical representation of the item to the mobile avatar while the non-stationary entity is moving within the 3D virtual space.

* * * * *